US009933985B2

(12) United States Patent
Forutanpour et al.

(10) Patent No.: US 9,933,985 B2
(45) Date of Patent: Apr. 3, 2018

(54) SYSTEMS AND METHODS FOR MANAGING CONTENT PRESENTATION INVOLVING A HEAD MOUNTED DISPLAY AND A PRESENTATION DEVICE

(71) Applicant: QUALCOMM Incorporated, San Diego, CA (US)

(72) Inventors: Babak Forutanpour, Carlsbad, CA (US); Daniel S. Baker, San Diego, CA (US); Jose R. Menendez, San Diego, CA (US); William E. Kimberly, San Diego, CA (US); Shriram Ganesh, San Diego, CA (US); Ramachandran Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 14/601,094

(22) Filed: Jan. 20, 2015

(65) Prior Publication Data
US 2016/0210097 A1    Jul. 21, 2016

(51) Int. Cl.
*G06F 3/14*  (2006.01)
*G02B 27/01*  (2006.01)

(52) U.S. Cl.
CPC ......... *G06F 3/1423* (2013.01); *G02B 27/017* (2013.01); *G02B 2027/014* (2013.01); *G02B 2027/0118* (2013.01); *G02B 2027/0123* (2013.01); *G02B 2027/0187* (2013.01)

(58) Field of Classification Search
CPC .................................................. G06F 3/1454
See application file for complete search history.

(56) References Cited

U.S. PATENT DOCUMENTS

| 8,351,779 | B2 | 1/2013 | Kageyama | |
|---|---|---|---|---|
| 2008/0318639 | A1* | 12/2008 | Crestol | H04M 1/6066 455/569.1 |
| 2011/0239142 | A1 | 9/2011 | Steeves et al. | |
| 2011/0249122 | A1 | 10/2011 | Tricoukes et al. | |
| 2012/0050141 | A1* | 3/2012 | Border | G02B 27/017 345/8 |
| 2012/0127284 | A1* | 5/2012 | Bar-Zeev | G02B 27/017 348/53 |
| 2012/0166985 | A1 | 6/2012 | Friend et al. | |
| 2012/0274750 | A1* | 11/2012 | Strong | G01C 21/165 348/52 |
| 2013/0147686 | A1 | 6/2013 | Clavin et al. | |
| 2013/0187835 | A1* | 7/2013 | Vaught | G06K 9/00604 345/8 |

(Continued)

*Primary Examiner* — Gregory J Tryder
*Assistant Examiner* — Jitesh Patel
(74) *Attorney, Agent, or Firm* — Kilpatrick Townsend & Stockton, LLP

(57) ABSTRACT

Various arrangements are presented to facilitate the handoff of presentation of content between a head mounted display (HMD) and another presentation device, such as a television. For example, based upon separate events, video and audio being presented to a user via a presentation device may be handed off to an HMD that the user is wearing for continued presentation. In response to a first reference event occurring, the HMD may initiate continued presentation of the video content that was being viewed by the user on the presentation device. At a later time, in response to a second reference event, the HMD may initiate continued presentation of the audio content.

38 Claims, 10 Drawing Sheets

(56) References Cited

U.S. PATENT DOCUMENTS

| | | | |
|---|---|---|---|
| 2013/0293468 A1* | 11/2013 | Perez | G06F 3/033 |
| | | | 345/158 |
| 2014/0015736 A1* | 1/2014 | Kim | G06F 3/1454 |
| | | | 345/1.2 |
| 2014/0118631 A1* | 5/2014 | Cho | G02B 27/017 |
| | | | 348/836 |
| 2014/0139439 A1* | 5/2014 | Park | G06F 3/04886 |
| | | | 345/169 |
| 2014/0256429 A1* | 9/2014 | Kobayashi | A63F 13/02 |
| | | | 463/31 |
| 2014/0273859 A1* | 9/2014 | Luna | H04W 4/008 |
| | | | 455/41.3 |

\* cited by examiner

SYSTEMS AND METHODS FOR MANAGING CONTENT PRESENTATION INVOLVING A HEAD MOUNTED DISPLAY AND A PRESENTATION DEVICE

BACKGROUND

Head mounted displays (HMDs) are becoming increasingly common, allowing the user of the HMD to view video via one or more displays or projectors of the HMD and, with some types of HMDs, listen to audio via one or more speakers of the HMD. While HMDs are becoming increasingly common, for various reasons (e.g., power consumption, limited video resolution, comfort, desire to not have sensory isolation in a group setting, etc.), a user may desire to use another presentation device, such as a television, to view content while wearing the HMD or having an HMD nearby.

SUMMARY

An example method for managing content presentation involving a head mounted display (HMD), where the HMD is configured to permit a field of view of at least a portion of a surrounding environment, according to the disclosure, includes determining, by the HMD, that video content output of a presentation device separate from the HMD is within the field of view, wherein the presentation device outputs the video content and audio content, and detecting, by the HMD, a first reference event indicating that the video content output of the presentation device is no longer within the field of view. The method further includes, in response to the first reference event, initiating, by the HMD, continued presentation of the video content via the HMD, and, after the first reference event, detecting, by the HMD, a second reference event. The method further includes, in response to the second reference event, initiating, by the HMD, continued presentation of the audio content via the HMD, where the HMD initiates continued presentation of the audio content at a later time than when the HMD initiates the continued presentation of the video content.

Such example method may include one or more of the following features. Detecting the first reference event can include measuring, by the HMD, a color temperature of at least a portion of the field of view comparing the measured color temperature with a reference color temperature, and based on comparing the measured color temperature with the reference color temperature, determining that the first reference event has occurred. Determining that the video content output of the presentation device is within the field of view can include measuring, by the HMD, a color temperature of at least a portion of the field of view, comparing the measured color temperature with a threshold color temperature, and based on the comparison, determining that the video content output of the presentation device is within the field of view. Detecting the second reference event can include determining a first location of the HMD, calculating a distance from the first location to a second location of the presentation device, comparing the distance to a threshold distance, and based upon comparing the distance to the threshold distance, determining that the second reference event has occurred. Detecting the second reference event can include measuring, via a microphone of the HMD, a signal-to-noise ratio of the audio content output by the presentation device, comparing the measured signal-to-noise ratio of the audio content to a threshold signal-to-noise ratio, and based upon comparing the measured signal-to-noise ratio of the audio content to the threshold signal-to-noise ratio, determining that the second reference event has occurred. At least five seconds can elapse between the first reference event and the second reference event. Initiating the continued presentation of the audio content via the HMD can include fading in the audio content from a first volume to a second, louder volume and/or fading in a brightness of the video content to be presented via the HMD.

An example system for managing content presentation via a head mounted display (HMD), where the HMD is configured to permit a field of view of at least a portion of a surrounding environment, according to the disclosure, includes memory and one or more processors coupled to the memory and configured to determine that video content output of a presentation device separate from the HMD is within the field of view, wherein the presentation device outputs the video content and audio content detect a first reference event indicating that the video content output of the presentation device is no longer within the field of view, and, in response to the first reference event, initiate continued presentation of the video content via the HMD. The instructions further cause the one or more processors to, after the first reference event, detect a second reference event, and, in response to the second reference event, initiate continued presentation of the audio content via the HMD, where the HMD initiates continued presentation of the audio content at a later time than when the HMD initiates the continued presentation of the video content.

The example system can further include one or more of the following features. The one or more processors may be further configured to measure a color temperature of at least a portion of the field of view, compare the measured color temperature with a reference color temperature, and based on comparing the measured color temperature with the reference color temperature, determine that the first reference event has occurred. The one or more processors may be further configured to measure a color temperature of at least a portion of the field of view, compare the measured color temperature with a threshold color temperature, and, based on the comparison, determine that the video content output of the presentation device is within the field of view. The one or more processors may be further configured to determine a first location of the HMD, calculate a distance from the first location to a second location of the presentation device, compare the distance to a threshold distance, and based upon comparing the distance to the threshold distance, determine that the second reference event has occurred. The one or more processors may be further configured to measure, via a microphone of the HMD, a signal-to-noise ratio of the audio content output by the presentation device, compare the measured signal-to-noise ratio of the audio content to a threshold signal-to-noise ratio, and based upon comparing the measured signal-to-noise ratio of the audio content to the threshold signal-to-noise ratio, determine that the second reference event has occurred. The one or more processors may be further configured to initiate the continued presentation of the audio content via the HMD by fading in the audio content from a first volume to a second, louder volume. The one or more processors may be further configured to initiate the continued presentation of the video content via the HMD by fading in a brightness of the video content to be presented via the HMD.

Another example system for managing content presentation involving ahead mounted display (HMD), wherein the HMD is configured to permit a field of view of at least a portion of a surrounding environment, according to the disclosure, can include means for determining that video content output of a presentation device separate from the HMD is within the field of view, wherein the presentation device outputs the video content and audio content, means for detecting a first reference event indicating that the video content output of the presentation device is no longer within the field of view, and means for initiating continued presentation of the video content via the HMD in response to the first reference event. The example system can further include means for detecting a second reference event after the first reference event, and means for initiating continued presentation of the audio content via the HMD in response to the second reference event, where the HMD initiates continued presentation of the audio content at a later time than when the HMD initiates the continued presentation of the video content.

The example system can include one or more of the following features. The means for detecting the first reference event device can include means for measuring a color temperature of at least a portion of the field of view, means for comparing the measured color temperature with a reference color temperature, and means for determining that the first reference event has occurred based on comparing the measured color temperature with the reference color temperature. The means for determining that the video content output of the presentation device is no longer within the field of view can include means for measuring a color temperature of at least a portion of the field of view, means for comparing the measured color temperature with a threshold color temperature, and means for determining that the user is viewing the video content output by the presentation device based on the comparison. The means for detecting the second reference event can include means for determining a first location of the HMD, means for calculating a distance from the first location to a second location of the presentation device, means for comparing the distance to a threshold distance, and means for determining that the second reference event has occurred based upon comparing the distance to the threshold distance. The means for detecting the second reference event can include means for measuring, at the HMD, a signal-to-noise ratio of the audio content output by the presentation device, means for comparing the measured signal-to-noise ratio of the audio content to a threshold signal-to-noise ratio, and means for determining that the second reference event has occurred based upon comparing the measured signal-to-noise ratio of the audio content to the threshold signal-to-noise ratio. The means for initiating the continued presentation of the audio content via, the HMD can include means for fading in the audio content from a first volume to a second, louder volume. The means for initiating the continued presentation of the video content via the HMD can include means for fading in a brightness of the video content to be presented via the HMD.

An example method for managing content presentation, according to the disclosure, includes determining, by a first head mounted display (HMD) configured to permit a first field of view of at least a portion of a surrounding environment, that video content output of a presentation device is within the first field of view, wherein the presentation device outputs the video content. The method further includes detecting, by the first HMD, a first reference event indicating that the video content output of the presentation device is no longer within the first field of view, and in response to the first reference event, initiating, by the first HMD, continued presentation of the video content via the first HMD. The method also includes determining that the video content output of the presentation device is still being viewed, and, in response to determining the video content output of the presentation device is still being viewed, continuing presentation of the video content at the presentation device, wherein the video content presented by the presentation device corresponds to the video content presented by the first HMD.

The example method can further include one or more of the following features. Detecting the first reference event can include measuring a color temperature of at least a portion of the first field of view, and determining that the first reference event has occurred based, at least in part, on a comparison of the measured color temperature with a threshold color temperature. Determining that the video content output of the presentation device is within the first field of view can include measuring a color temperature of at least a portion of the first field of view, and determining that the video content output of the presentation device is within the first field of view based, at least in part, on a comparison of the measured color temperature with a threshold color temperature. Determining that the video content output of the presentation device is still being viewed can include analyzing a captured image of a viewing region of the video content of the presentation device, and determining, based on the captured image, a user is present in the viewing region. Determining that the video content output by the presentation device is still being viewed is based on a location of a second HMD. The method can further include detecting, by a second HMD configured to permit a second field of view of at least a second portion of the surrounding environment, a second reference event indicating that the presentation device is no longer within the second field of view, and, in response to detecting the first reference event and the second reference event, ceasing continued presentation of the video content by the presentation device.

Another example system for managing content presentation, according to the disclosure, can include memory and one or more processors coupled to the memory and configured to determine that, for a first head mounted display (HMD) configured to permit a first field of view of at least a portion of a surrounding environment, video content output of a presentation device is within the first field of view, wherein the presentation device is outputting the video content, detect a first reference event indicating that the video content output of the presentation device is no longer within the first field of view, and in response to the first reference event, initiate continued presentation of the video content via the first HMD. The instructions further cause the one or more processors to determine that the video content output by the presentation device is still being viewed, and, in response to determining the video content output of the presentation device is still being viewed, continue presentation of the video content at the presentation device, wherein the video content presented by the presentation device corresponds to the video content presented by the first HMD.

The system can further include instructions for causing the one or more processors to provide one or more of the following features. The one or more processors may be further configured to measure, via the first HMD, a color temperature of at least a portion of the first field of view, compare the measured color temperature with a threshold color temperature, and based on the comparison, determine that the first reference event has occurred. The one or more processors may be further configured to measure, via the first HMD, a color temperature of at least a portion of the first field of view, compare the measured color temperature with a threshold color temperature, and based on the comparison, determine that the video content output of the presentation device is within the first field of view. The one or more processors may be further configured to analyze a captured image of a viewing region of the video content of the presentation device, and determine, based on the captured image, a user is present in the viewing region. The one or more processors may be further configured to determine that the video content output by the presentation device is still being viewed, e.g., based on a location of a second HMD. The one or more processors may be further configured to detect, by a second HMD configured to permit a second field of view of at least a second portion of the surrounding environment, a second reference event indicating that the presentation device is no longer within the second field of view, and, in response to detecting the first reference event and the second reference event, cease continued presentation of the video content by the presentation device. The system can include the first HMD and a second HMD.

An example system for managing content presentation, according to the disclosure, can include means for determining that, for a first head mounted display (HMD) configured to permit a first field of view of at least a portion of a surrounding environment, video content output of a presentation device is within the first field of view, wherein the presentation device outputs the video content, means for detecting, via the first HMD, a first reference event indicating that the video content output of the presentation device is no longer within the first field of view, and means for initiating continued presentation of the video content via the first HMD in response to the first reference event. The system can further include means for determining that the video content output of the presentation device is still being viewed, and means for continuing presentation of the video content at the presentation device in response to determining the video content output of the presentation device is still being viewed, wherein the video content presented by the presentation device corresponds to the video content presented by the first HMD.

The system can further include one or more of the following features. Means for detecting the first reference event can include means for measuring a color temperature of at least a portion of the first field of view, means for comparing the measured color temperature with a threshold color temperature, and means for determining that the first reference event has occurred based on the comparison. Means for determining the video content output of the presentation device is within the first field of view can include means for measuring a color temperature of at least a portion of the first field of view, means for comparing the measured color temperature with a threshold color temperature, and means for determining that the video content output of the presentation device is within the first field of view based on the comparison. The means for determining that the video content output of the presentation device is still being viewed can include means for analyzing a captured image of a viewing region of the video content of the presentation device, and means for determining, based on the captured image, a user is present in the viewing region. The system can include means for determining that the video content output by the presentation device is still being viewed uses a location of the second HMD. The system can further include means for detecting, by a second HMD configured to permit a second field of view of at least a second portion of the surrounding environment, a second reference event indicating that the presentation device is no longer within the second field of view, and means for ceasing continued presentation of the video content by the presentation device in response to detecting the first reference event and the second reference event.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
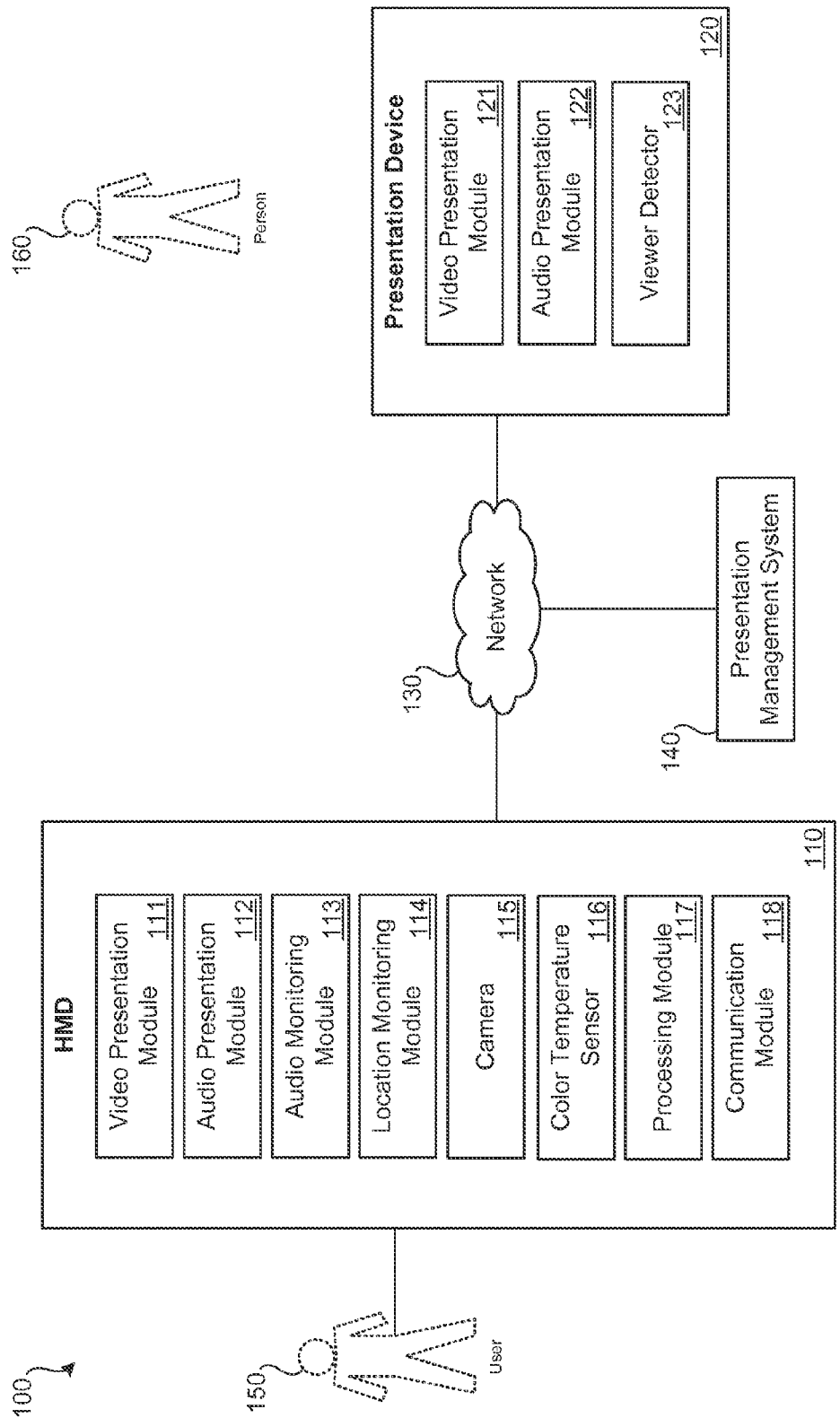
FIG. 1 illustrates an embodiment of a system that is configured to manage content presentation, in accordance with certain example implementations.

If a user desires to transition between use of a head mounted display (HMD) and a presentation device (such as a television, projector, in-vehicle screen, tablet computer, personal (e.g., desktop, laptop) computer, or some other non-HMD content presentation device) it may be beneficial to the user's experience to transition video content and audio content at specific times and or in specific manners. By way of example, it may be useful in certain instances to transition video content and audio content at different times. For example, a user may be viewing a presentation device and watching/hearing content (which may contain audio and video portions) that is being played back. Let us also assume that this user may already be wearing or may begin wearing an HMD. In certain instances, such a user may, for various reasons, desire or need to leave the area nearby the presentation device and move somewhere else such as to another room. When this user turns in some manner or otherwise looks away from the presentation device (or, such as in the case of a projector, video projected onto a surface by the projector), it may be useful for the video content portion of the content to transition from being presented on the presentation device to being presented by the HMD. In certain example implementations, the transition/presentation may be continuous such that the video content as presented by the HMD picks up in synchronization with the content presented by the presentation device. In some instances (as described by way of example herein), at a later time the corresponding audio content may also be transitioned to the HMD. Therefore, when this example, the user is a short distance from the presentation device the user may still listen to the audio content via the presentation device, but when the user moves some further distance away, such as into another room, the audio content may also be transitioned to being output by the HMD. In some embodiments, it may be preferable to transition audio before video, such as in a noisy environment (e.g., a vacuum cleaner is running). As such, it should be understood that some embodiments herein may affect the timing and/or a manner in which audio content and/or video content may be transitioned to or from an HMD.

Using similar techniques, presentation of content via an HMD to a user may be transitioned to a presentation device. Returning to the previous example, the presentation device may have continued to present the content while the user was out of the room. Upon coming within some a particular distance of the presentation device, audio content may cease to be output by the HMD, e.g., since the user may be able to hear the audio content output by the presentation device. In circumstances wherein the presentation of content at the presentation device and the HMD may be synchronized, the audio content the user hears via the presentation device can be expected to be synchronized with the video content the user may be viewing via the HMD. After a time, such as once the user has walked to the vicinity of the presentation device and possibly started viewing the presentation device, the video content may be transitioned from the HMD as the user may view such via the presentation device. This may involve, for example, the HMD ceasing to present the video content at some point in time. Once the video and audio content has transitioned from the HMD to the presentation device, the user may remain wearing the HMD or may remove the HMD. Hence, presentation of the content to the user may be substantially continuous in certain instances by selectively promoting all or portions of content playback through the HMD, the presentation device, or a mixture of both. It should also be understood, that in certain implementations, a presentation device may comprise one or more content playback devices. For example, a presentation device may comprise one or more video content playback devices and one or more audio content playback devices.

Various techniques may be employed to detect whether a user may be facing and possibly viewing a presentation device. For example, in some embodiments, a color temperature analysis may be performed based on video input from one or more camera(s) of an HMD to determine whether or not a presentation device may viewable by a user wearing the HMD. To do so, at least a portion of an image captured by at least one camera of the HMD's may have its color temperature measured. The measured color temperature my be compared to a reference color temperature, e.g., corresponding to a presentation device. A color temperature of a presentation device may, in certain implementations, be expected to be different (e.g., significantly higher) than some color temperature of other sources, such as in the range of 5500K-10500K. For instance, the color temperature of natural lighting and many forms of indoor lighting may have lower color temperatures than a presentation device. Therefore, if a user is turned away from a presentation device, the color temperature measured off of objects in the HMD's field of view, which would likely be reflecting mostly indoor lighting or natural lighting, may be below a threshold reference color temperature. However, if the user is facing at a presentation device, the color temperature measured in at least a point or possibly a region of the HMD's field of view may be above a threshold reference color temperature due to the color temperature of the illuminated presentation device.

The terms "head mounted display" or "HMD" as generally used herein may refer to any of a variety of electronic devices that are wearable on a user's body in some manner. As suggested by the term "head", some HMDs may actually be worn in some manner on a user's head. An HMD may include features, optics, circuits, and/or the like or some combination thereof which may enable a user to view images that may be displayed. In some embodiments, for example, an HMD may be configured to reflect projected images directly into one or both of a user's eyes. Some HMDs may include displays (e.g., LED, LCD, etc.) that may be viewable—directly or indirectly—by a user. Some HMDs may include "see through" displays that enable a user to see at least a portion of a surrounding environment though a transparent or semi-transparent display, which may also be capable of showing displayed images to the user. Some HMDs may utilize one or more cameras and one or more miniature displays to allow a user to see at least a portion of the user's environment via images captured by one or more cameras and presented to the user on one or more displays. Moreover, as described below, some HMDs may also include audio playback and/or other capabilities. A person of ordinary skill in the art should recognize that various types of HMDs may be applicable in the embodiments provided herein.

Attention is now drawn to FIG. 1, which illustrates an example embodiment of a system 100 that is configured to manage content presentation. System 100 may include an HMD 110, a presentation device 120, a network 130, and a presentation management system 140. While system 100 is described as involving a single HMD 110, it should be understood that system 100 may involve multiple HMDs. For example, in some embodiments, person 160 also is using an HMD. Likewise, while system 100 is described as involving a single presentation device 120, it should be understood that system 100 may involve multiple presentation devices.

As illustrated in this example, HMD 110 may be used/worn by user 150. In this example, it is assumed that HMD 110 may permit user 150 to view video that is overlaid or otherwise combined in some manner within the HMD's field of view. By way of example, HMD 110 may be worn in the form of glasses or goggles that may permit images to be projected or otherwise presented on at least semi-transparent lens. Therefore, when wearing HMD 110, user 150 may be viewing video content and may also be viewing real-world objects through HMD 110. In other embodiments, HMD 110 may only occupy a portion of the field of view. For instance, a screen or lens of HMD 110 may only occupy a portion of an HMD's field of view, possibly associated with only one of the user's eyes. Other embodiments of HMD 110 may also be possible, such as direct projection onto user's 150 retinas.

HMD 110 may generally include certain components, such as video presentation module 111, audio presentation module 112, audio monitoring module 113, location monitoring module 114, camera 115, color temperature sensor 116, processing module 117, and/or communication module 118. It should be understood that such components have been reduced to a block diagram. HMD 110 may contain other components, such as a memory, a power supply, etc. Video presentation module 111 may permit video to be presented within the field of view of HMD 110. Therefore, while using/wearing HMD 110, user 150 can view real-world objects and also virtual objects that may be presented by video presentation module 111. Video presentation module 111 may, in some embodiments, be in the form of a projector that projects virtual objects, such as video content, onto a lens or other object within the field of view. While user 150 is using/wearing HMD 110, user 150 may also be viewing all or part of presentation device 120. For instance, presentation device 120 may be presenting (e.g., playing back) video and audio content. Meanwhile, HMD 110 may not be presenting any content at all, or may be presenting some related content and/or some content that may be unrelated to the content presented by presentation device 120.

Audio presentation module 112 may, for example, permit user 150 to listen to audio content. Audio presentation module 112 may be in the form of one or more speakers. In some embodiments, audio presentation module includes two speakers, with each speaker being directed to a different ear of user 150. In some embodiments audio presentation module may comprise one or more earphone or other like wired or wireless interfaces that may be coupled to one or more headphones and/or other like external speakers.

Audio monitoring module 113 may include one or more microphones. Audio monitoring module 113 may be intended to collect audio from the environment surrounding HMD 110. For instance, audio monitoring module 113 may be configured to collect and receive audio being output by presentation device 120. Audio monitoring module 113 may be directional; that is, audio monitoring module 113, such as by using multiple microphones, may be able to determine a direction from which sound is originating e.g., with regard to the HMD and/or a user that may be wearing the HMD.

Location monitoring module 114 may include multiple subcomponents. Location monitoring module 114 may include a global navigation satellite system (GNSS) receiver, such as a global positioning system (GPS) receiver. Such a GNSS receiver may be used to determine the location of HMD 110, such as in relation to presentation device 120. Location monitoring module 114 may also include an accelerometer, gyroscope, magnetometer, WiFi radio, Bluetooth® radio, light sensor, etc. Such components may also be used for location determination, such as dead reckoning, to determine where the HMD is located. Such components may also be used to determine which direction that user 150, who is wearing HMD 110, is likely to be facing. Location monitoring module 114 may use information gathered from such multiple subcomponents to determine where user 150 and HMD 110 is located and/or which direction that user 150 and HMD 110 may be facing. Location module 114 (possibly along with other modules in HMD 110) may, for example, be configured to detect the presence of a presentation device within a vicinity of the HMD, e.g., using wireless RF signals, infrared signals, user input, sounds, lights, prompts from other devices via network 130, etc.

In some embodiments, one or more cameras (represented by camera 115) may be used to continuously or periodically capture image(s) in a direction that user 150 may be facing. Therefore, camera 115 may, in certain implementations, have some amount of overlap with a user's direct view via the HMD. In some embodiments, an additional camera may be present that monitors one or both of a user's eyes, e.g., to possibly determine what the user may or may not be looking at (e.g., be it a real-world object or virtual object projected by video presentation module 111).

Color temperature sensor 116 may, for example, measure a color temperature or some other like parameter corresponding to a field of view presented to a user by the HMD based on one or more images captured by camera 115. In some embodiments, pixel data may be received or otherwise obtained by color temperature sensor 116 from camera 115. In some embodiments, color temperature sensor 116 may have a separate sensor from camera 115. Color temperature sensor 116 may be used to determine the color temperature of a point (e.g., the center focal point at which user 150 may be looking, if user 150 is looking straight ahead). In some implementations, color temperature sensor 116 may be used to determine the color temperature of a region of an image captured by camera 115. In some embodiments, the region corresponds to the center region of a view of camera 115, thus generally corresponding to an area toward which user 150 would generally be looking, if looking straight ahead. In some embodiments in which the gaze of user's 150 eye(s) may be monitored, a region or a point for which color temperature may be measured may be adjusted to match the direction in which user 150 may be deemed to be looking. Hence, in some instances a region or point corresponding to color temperature may preset, or may dynamically change.

Figure 10:
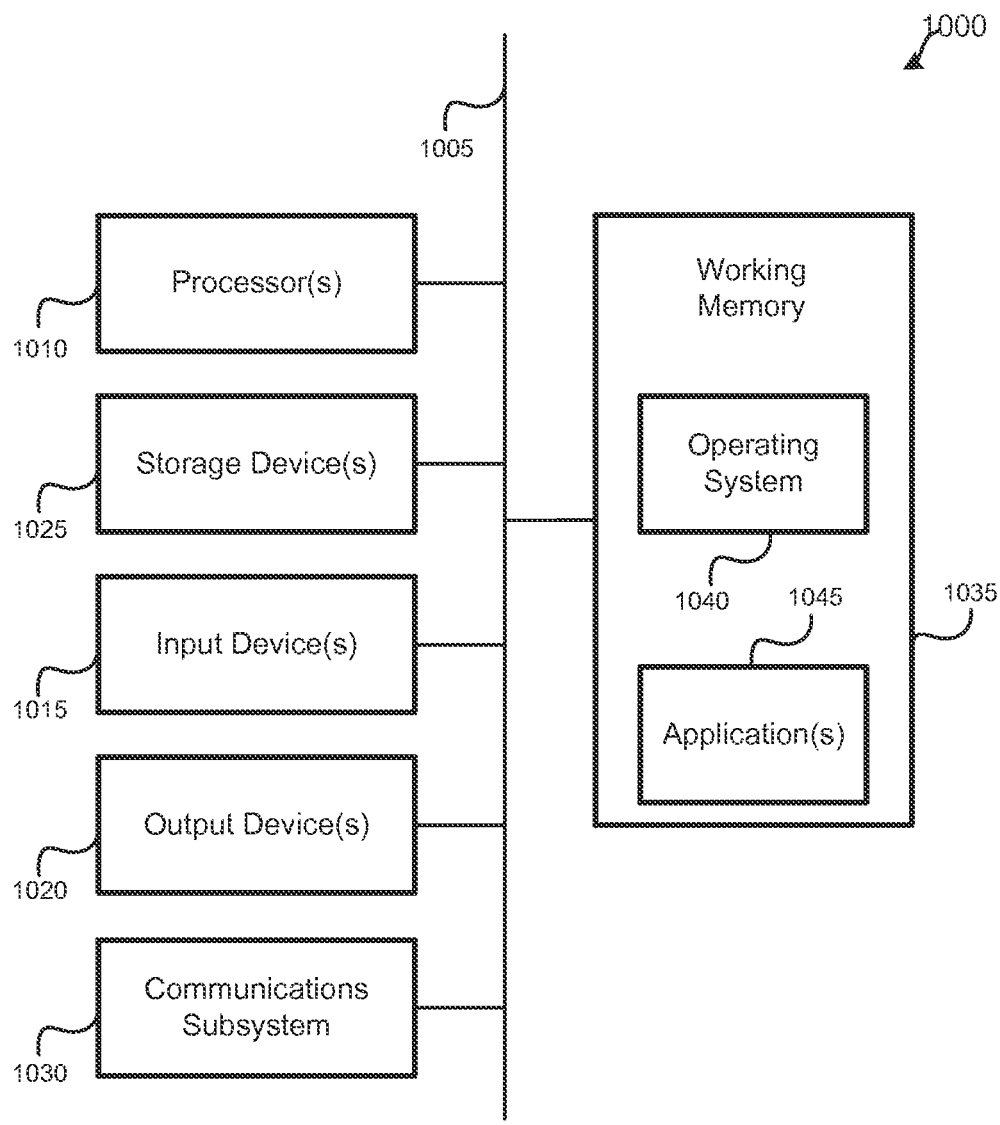
FIG. 10 illustrates an embodiment of a computer system, in accordance with certain example implementations.

Processing module 117 may represent one or more general-purpose or specialized processors configured to process input received from audio monitoring module 113, location monitoring module 114, camera 115, color temperature sensor 116, communication module 118, and/or other modules within HMD. Processing module 117 may also be configured to output video content to video presentation module 111, audio to audio presentation module 112, and various data to communication module 118. Generally, HMD 110 can be understood as a wearable computer. Therefore, various computerized components may be provisioned on-board, such as a non-transitory computer-readable storage medium (not shown). Computer system 1000 of FIG. 10 provides a generalized description of computerized components which may also be incorporated as part of HMD 110.

Communication module 118 may comprise one or more network interfaces that may be configured to communicate wirelessly (or via a wire) via one or more protocols with other devices and/or networks, such as network 130). For instance, communication module 118 may directly or indirectly receive video content and audio content for presentation to user 150 from network 130, e.g., presentation management system 140, or presentation device 120. Communication module 118 may be further configured to directly or indirectly transmit data to network 130, presentation management system 140, or presentation device 120. Communication module 118 may employ a variety of protocols, such as protocols that may involve the 802.11a/b/g standards, Bluetooth®, WiFi Direct®, just to name a few non-limiting examples.

Network 130 may include one or more networks, some of which nay be private and others public. For instance, network 130 may include a home wireless network. Network 130 may include a public network such as the Internet. Therefore, by HMD 110 communicating with network 130, HMD 110 may be able to communicate with other, local devices, such as presentation device 120 and may also be able to communicate with systems that may be available via the Internet, such as presentation management system 140.

Presentation device 120 may be a single device or may be multiple components. For instance, presentation device 120 may be a television or computer that has a screen (video presentation module 121) for presentation of video content and one or more speakers (audio presentation module 122) for presentation of audio content. In some embodiments, a presentation device may comprise a projector that may project video onto a surface. In some embodiments, audio presentation module 122 may be a separate component, such as a receiver connected with one or more speakers. Additional components may also be considered part of presentation device 120, such as a television receiver (e.g., cable set top box), DVD player, Blu-Ray® player, or Internet-based content player, just to name a few examples. Collectively, the device or devices used to output video content and audio content for presentation to the user are referred to as presentation device 120. Besides a television, presentation device 120 may include a tablet computer, gaming device, computer system, projector system, etc. To be clear, video presentation module 121 and audio presentation module 122 may be usable separate from HMD 110. Therefore, even though user 150 may be wearing/using HMD 110, person 160 may be viewing and listening to content output for presentation by presentation device 120. Person 160 may not be using any HMD at the time. (For clarity, for the examples in this document, the term "user" is intended to refer to a person using an HMD, the term "person" is intended to refer to someone not using an HMD, and the term "viewer" as used with regard to a presentation device may be either a person or user.)

Presentation device 120 may also include viewer detector 123. Viewer detector may be used to monitor if one or more users (such as user 150) and/or persons (such as person 160) may be watching presentation device 120 and/or may otherwise be in the vicinity of presentation device 120. For instance, if user 150 turns away from presentation device 120, in certain implementations it may be determined using data from viewer detector 123, whether person 160 is still viewing content via presentation device 120. If not, in certain implementations presentation device 120 may be powered down; if person 160 is viewing content, presentation device 120 may continue presenting the content. Viewer detector 123 may face or otherwise correspond to a region in which users/persons are likely to be situated if viewing presentation device 120. Viewer detector 123 may, for example, be in the form of one or more cameras, from which images can be analyzed for the presence of users and/or persons (e.g., using facial/body recognition techniques, etc.).

Presentation management system 140 may manage the presentation (via HMD 110 and/or presentation device 120) and/or distribution of content for such presentation. Presentation management system 140 of FIG. 1 is illustrated as being accessible via either a private network (e.g., with a home in which presentation device 120 and HMD 110 is located) or accessible via a public network (e.g., via the Internet, etc.). In certain implementations, presentation management system 140 may also be integrated (in whole or in part) as part of presentation device 120 and/or as part of HMD 110. Presentation management system 140 may handle alike or in different manners the distribution of audio and video content for presentation. In certain example implementations, presentation management system 140 may handle streaming or otherwise distributed video and/or audio content to HMD 110 and/or presentation device 120, either directly or via network 130. For instance, presentation management system 140 may have access to a source of video and audio content (not shown), such as an Internet-accessible content provider, stored recording, broadcast television, DVD, or Blu-Ray® Disc, just to name a few examples.

It should be understood that example system 100 of FIG. 1 represents a possible embodiment of a system that is configured to manage content presentation. Various other embodiments may contain additional components or may contain fewer components. Further, the sub-components of devices such as RAID 110 and presentation device 120 may vary.

Figure 2:
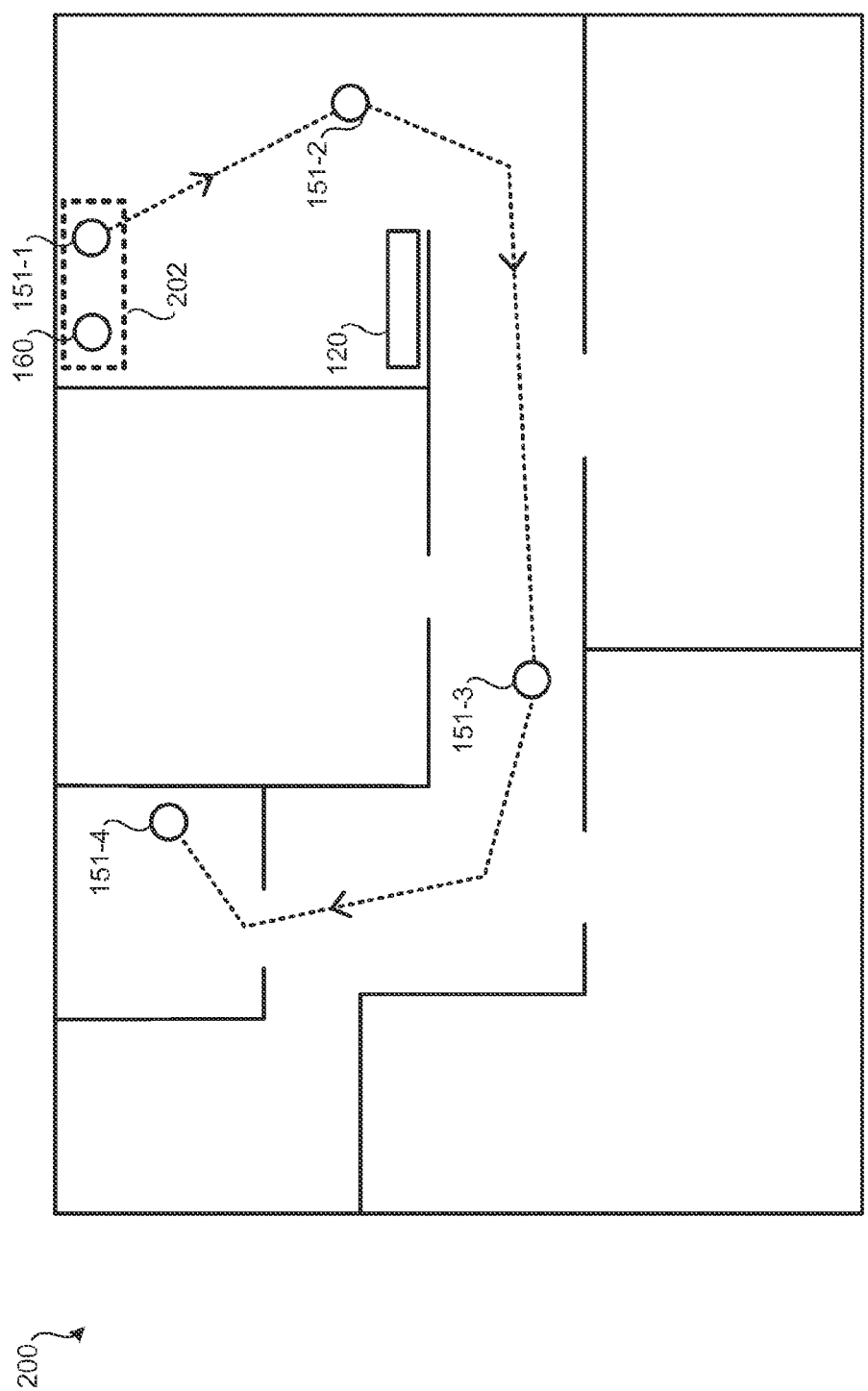
FIG. 2 illustrates an embodiment of a floor plan indicative of an environment wherein a handoff or other like transition of video content, audio content, or both, from a presentation device to an HMD, may be performed in accordance with certain example implementations.

FIG. 2 illustrates an example embodiment of a floor plan 200 indicative of a presentation device to HMD "handoff" of video content and audio content. Floor plan 200 may be indicative of a place in which system 100 is being used to manage content presentation. On floor plan 200, the actions of user 150, who is using/wearing HMD 110, and person 160 are detailed. Person 160 remains viewing presentation device 120, while user 150 changes his location. As an example, person 160 and user 150 may be sitting together on a couch 202 while watching presentation device 120, which may be a television. Hence, for example, a first location of user 150 is indicated by user location 151-1 which is adjacent person 160 on couch 202. In the following examples, it is assumed that user 150 is wearing an HMD in a manner as intended for at least one use, and that as such a field of view as experienced by user 150 through the HMD corresponds, at least in part, to a direction that user 150 may be physically facing or otherwise have all or part of their body adjusted or turned in some manner towards. For example, in certain instances user 150 may turn their head, or some portion or all of their body in some manner that may be result in a change in the field of view as experienced by user 150 through the HMD.

With this in mind, after a time, user 150 at user location 151-1 may, for some reason, decide to turn away from presentation device 120. For instance, user 150 may turn away from presentation device 120 because he stands up from sitting on couch 202 and walks out of the room. Hence, a second location of user 150, represented by user location 151-2, may represent the location at which the user turns away from presentation device 120. Accordingly, the dashed lines connecting the various illustrated user locations 151-1, 151-2, 151-3, and 151-4 may correspond to the user path of movement.

User 150 turning away from presentation device 120 (e.g., at location 151-2) may serve as a trigger event to cause the video content to be presented to user 150 HMD 110. To determine when a user has turned away from presentation device 120, various techniques may be used. In some embodiments, for example, a color temperature analysis may be used. A non-limiting example of a color temperature analysis is detailed in relation to arrangement 400 of FIG. 4 and method 900 of FIG. 9. In some embodiments, an estimated location of the HMD that user 150 is wearing may be used, as described in greater detail herein. In some embodiments, such an estimated location of the HMD that user 150 is wearing may be used in conjunction with a direction in which HMD 110 may be pointed to determine whether it is likely that user 150 may or may not be facing and possibly viewing presentation device 120. Gaze detection may be used to determine if the user may be looking at presentation device 120 in certain implementations. In some embodiments, user 150 may press or otherwise provide some form of an input to HMD 110 that may indicate that the user is or is not facing/viewing presentation device 120. Images captured by viewer detector 123 of presentation device 120 may be used, at least in part, to determine whether user 150 may or may not be facing presentation device 120. Camera 115 of HMD 110 may be used to monitor for a marker associated with presentation device 120. Such marker may, for example, be present in video content presented by presentation device 120. Object recognition may be performed on images captured by camera 115 of HMD 110 to determine, at least in part, if user 150 may or may not be facing presentation device 120. In some embodiments, certain detected movements of HMD 110 may be used, at least in part, to determine whether user 150 may or may not be facing presentation device 120. In some embodiments, various combinations of the above forms of analysis may be used to determine whether or not user 150 may be facing presentation device 120. In some implementations, a minimum threshold time of facing away from (or conversely towards) presentation device 120 may be required to be maintained before user 150 is determined to be facing away (or conversely facing towards) presentation device 120. For instance, if user 150 turns towards person 160 for only a few seconds whilst sitting on couch 202, this duration of looking away may be insufficient to trigger any action. Therefore, one or more reference minimum threshold times my be defined, such as by user 150, that indicates a time duration that user 150 must be looking away from (or conversely towards) presentation device 120 for applicable action to be taken.

Regardless of the arrangement used, user 150 as illustrated in this example at user location 151-2 represents the location at which the user has ceased to face presentation device 120 (and, possibly, at least a reference period of time of being turned away from presentation device 120 has elapsed). At this point, the video content presented by presentation device 120 may also be presented by HMD 110 to user 150 at user location 151-2. In some circumstances, the video content may be synchronized to some extent, such that the video content still currently being presented by presentation device 120 is substantially simultaneously presented by HMD 110 to user 150 at user location 151-2. Presentation of the video content may fade in (e.g., increased in brightness) to be presented via the HMD. For instance, a default setting or user setting of the HMD may define a time period over which video content is faded into presentation on HMD 110. In some embodiments, video content is not faded in, but rather displayed without a fade-in period. As user 150 moves from user location 151-2 to user location 151-3, all or part of the video content that is synchronized with the video content of presentation device 120 may fall within the field of view of HMD 110. For the audio content, due to user's 150 proximity to presentation device 120 at locations 151-1 and possibly 151-2, the user may be able to hear the audio content from presentation device 120. Since the video content of HMD 110 and presentation device 120 may be synchronized, in certain instances the audio content being heard from presentation device 120 may also accurately correspond to the video content being presented by HMD 110.

In some embodiments, the audio content may vary based on the location of the user. For instance, if user 150 may be within auditory range of presentation device 120, but may not in an preferred position for stereo (or surround sound or some other stereoscopic auditory arrangement), HMD 110 may play audio content to the user, e.g., to possibly supplement or replace the audio content from presentation device 120. For instance, based upon the direction that user 110 is facing, at least a portion of the audio stream may be output by the presentation device (e.g., one ear's portion of the audio content) based on the location and/or direction in which HMD 110 may be facing. For example, referring to user location 151-2, it may be possible for user 150 to hear the audio content from presentation device 120 associated with the left ear, while the audio content associated with the right ear may be output by the HMD 110. Similarly, in certain implementations, various sound related parameters may be adjusted, e.g., to account for various acoustic issues that affect a user's experience. For example, a tone or volume level may be adjusted one or more audio channels which may improve playback. In some embodiments, the discrepancy between ears of the user be detected via multiple microphones present on the HMD.

Transfer (e.g., a "handoff") of the video content to HMD 110 may be handled by presentation management system 140, which may be part of presentation device 120, part of HMD 110, or may be a separate local or remote computerized system. Presentation management system 140 may attempt to ensure that the video content is initiated and continues playback in synchronization with the video content output by presentation device 120.

User 150 may continue to travel from user location 151-2 to user location 151-3 while being presented video content via HMD 110, possibly with corresponding audio content being output by presentation device 120. In this example, at user location 151-3 it may be assumed that the audio content may be presented by HMD 110.

A second trigger event may serve to determine when, if at all, audio content should be output for presentation to user 150 by HMD 110. The second trigger event can be expected to occur after the first trigger event because user 150 may stop facing presentation device 120, e.g., before user 150 exits auditory range of audio content output by presentation device 120. The second trigger may involve detection of various conditions. For instance, an estimated direct and/or routing distance between HMD 110 and presentation device 120 may be used. The estimated location of HMD 110 may be determined using location monitoring module 114 and the location of presentation device 120 may be known or determined in certain implementations. The distance between HMD 110 and presentation device 120 may be compared to a reference distance to determine when audio should be initiated at HMD 110. In some embodiments, audio monitoring module 113 may be used to determine when the volume of audio content output by presentation device 120 falls below a threshold volume or a threshold signal-to-noise ratio. The latter may be measured by comparing the audio signal being provided by presentation management system 140 and the audio signal measured by audio monitoring module 113. In some implementations, a user's step count (possibly with a direction) may be used to determine when audio should be provided via the HMD. In some embodiments, user 150 may provide some form of an input to trigger audio content to be presented by HMD 110, or conversely halted by HMD 110. Following the audio content being output by HMD 110, at user location 151-3 in this example, user 150 is being presented the same audio and video content via HMD 110 that person 160 is being presented via presentation device 120. Similar to video, the audio may be faded in/out, as may be applicable or otherwise desired. Therefore, by way of example, as a distance (e.g., traveled) between presentation device 120 and HMD 110 increases (and the audio content volume at HMD 110 received from presentation device 120 decreases), the volume of the audio content output by HMD 110 may be increased. In some embodiments, the audio may be faded in (e.g., increased in volume) as a count of the user's steps away from the presentation device increases. The audio content may be synchronized such that the audio content output by presentation device 120 may be substantially synchronized with the audio content output by HMD 110, e.g., at user location 151-3. The audio content may also synchronized with the video content being presented by HMD 110. Hence, as user 150 continues to user location 151-4, user 150 may experience the video and audio content via HMD 110. In some implementations, the audio content volume may be adjusted based on the measured volume of the audio content received at HMD 110 from presentation device 120 by audio monitoring module 113. It should be recognized that in many instances the converse may also be provided by HMD 110, e.g., audio content may be faded out, as might also the video content be applicably faded out, as a distance between HMD 110 and presentation device 120 decreases, or possibly as presentation device 120 begins presenting audio or video content.

Transfer of the audio content to HMD 110 may be handled by presentation management system 140, which may be part of presentation device 120, part of HMD 110, or may be a separate local or remote computerized system. Presentation management system 140 may ensure that the audio content is initiated and continues playback in synchronization with the audio content output by presentation device 120 and, possibly, with the video content being output for presentation to user 150 by HMD 110.

It should be understood that presentation device 120 may be actively outputting the video and audio content while user 150 is facing away (e.g. at user locations 151-2 and beyond) because person 160 (if present) may still be making use of presentation device 120. If person 160 (or another user) was not present or making use of presentation device 120, e.g., at user location 151-2 both audio and video content may be transferred to HMD 110 and presentation device 120 may be powered down (e.g., into a standby or off state) in certain implementations. In some embodiments, despite no one being present or making use of presentation device 120 once user 150 has been deemed as having turned away, presentation device 120 may nonetheless continue to output the video and audio content, e.g., unless or until a command instructing otherwise is received.

Figure 3:
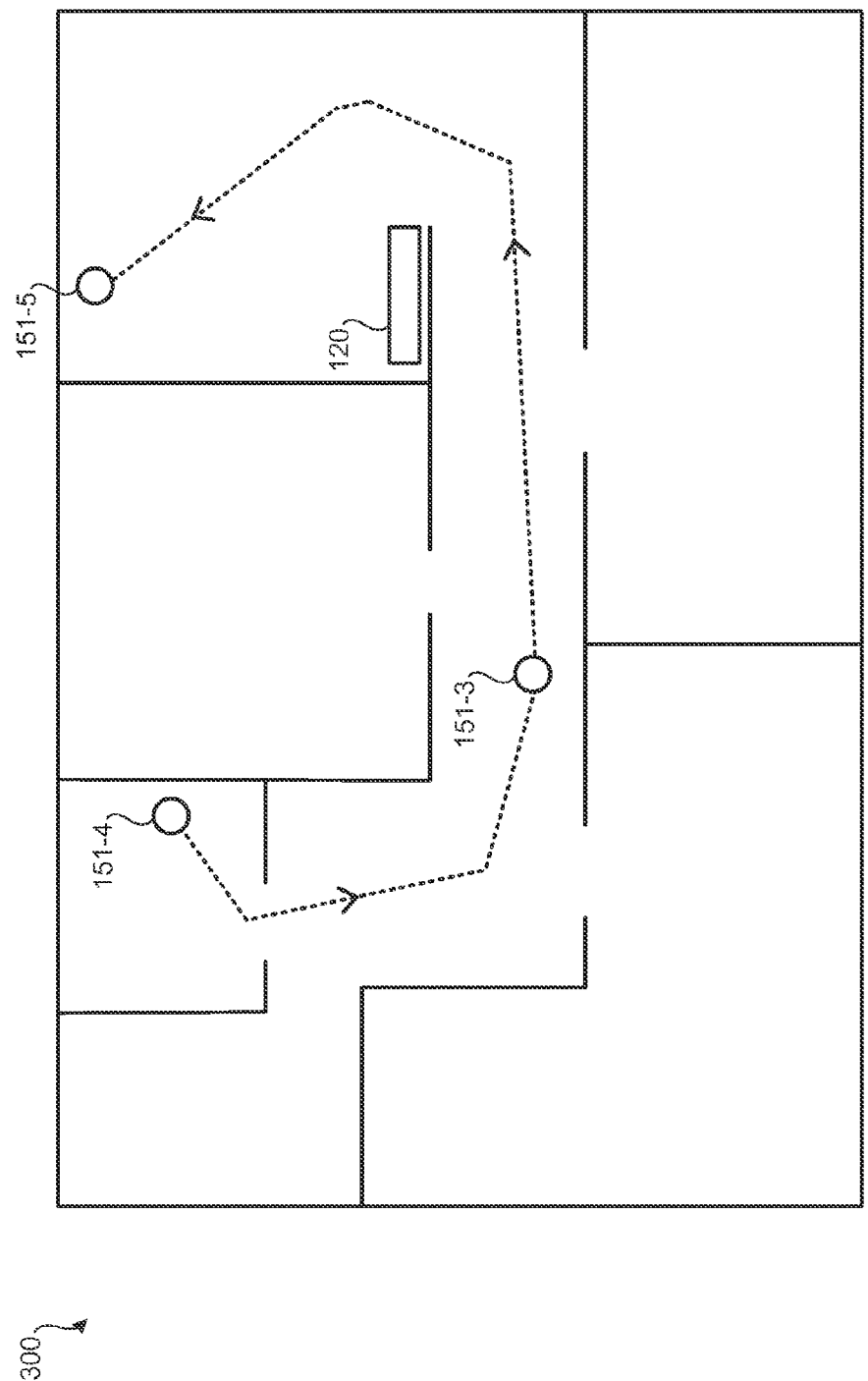
FIG. 3 illustrates an embodiment of a floor plan indicative of an environment wherein a handoff or transition of video content, audio content, or both, from an HMD to a presentation device, may be performed in accordance with certain example implementations.

FIG. 3 illustrates an example embodiment of a floor plan 300 indicative of an HMD to presentation device handoff of video content and audio content. Floor plan 300 may be indicative of a place in which system 100 is being used to manage content presentation. On floor plan 300, the actions of user 150, who is using/wearing HMD 110, are detailed. While floor plan 300 may represent the same structure as floor plan 200, person 160 is not present to view presentation device 120. In relation to floor plan 200, floor plan 300 may represent user 150 returning to hearing and viewing the audio and video content via presentation device 120.

At user location 151-4, user 150 may be viewing and hearing the video and audio content via HMD 110. This may remain true as user 150 travels from user location 151-4 to user location 151-3. At user location 151-3 a trigger may occur that causes audio content to cease being presented or otherwise change in some manner as being presented by HMD 110. For example, if presentation device 120 is outputting the audio content, at user location 151-3 the audio content output by HMD 110 may cease or may be faded out. User location 151-3 may be used as the location at or a region in which audio content may be ceased or faded out or otherwise changed in some manner by HMD 110 due to measurements made by audio monitoring module 113, a distance measurement made to presentation device 120, or any of the other techniques discussed in relation to determining when audio should be output from HMD 110. Hence, for example, the same or similar conditions/factors that were used to determine when audio content was output by HMD 110 may similarly be used to determine when audio content should stop being output by HMD 110. Once HMD 110 begins or ceases outputting audio content, at least a threshold period of time may be required to elapse before HMD 110 ceases, or begins again to output the audio content. If presentation device 120 is not already outputting the audio content, the audio content output by HMD 110 may cease or may be faded out once user 150 begins to face and possibly view presentation device 120, such as at user location 151-5.

From user location 151-3, user 150 travels to user location 151-5. User 150 may not face presentation device 120 until reaching user location 151-5. At user location 151-3, similar techniques may be used to determine whether user 150 may or may not be facing presentation device 120 as were previously described as being used to determine that user 150 was no longer facing presentation device 120 in relation to FIG. 2. For example, a color temperature analysis may be used (as detailed in relation to FIG. 4 and method 900 of FIG. 9) and/or the location (and/or direction) of HMD 110 may be used.

User 150 being at user location 151-5 and being determined to be facing presentation device 120 may serve as the trigger to cease or otherwise modify presentation of video content, audio content, or both via HMD 110. Continued presentation of the video content may, for example, be initiated at presentation device 120, or, if already in progress, presentation of the video content may continue to be output by presentation device 120. Once user 150 is deemed to be facing the presentation device 120, presentation of the video content via HMD 110 may cease. Ceasing presentation of video (and/or audio) may be gradual, such as by fading out the video presented by HMD 110. Once user 150 is deemed to be facing presentation device 120 and presentation device 120 is outputting both the video content and the audio content, user 150 may decide to stop using and/or wearing HMD 110. In some instances, the playback of content may be adjusted temporally (e.g., to synchronize playback) to account for differences between the presentations by HMD 110 and presentation device 120.

It should be understood that how video and/or audio content is transitioned from being presented to user 150 via HMD 110 to presentation device 120 may vary depending on if a person or another user is already being presented content via presentation device 120. For example, if person 160 was still viewing presentation device 120 as in floor plan 200 of FIG. 2 (e.g., FIG. 3 represents user 150 returning to watching presentation device after leaving the room in FIG.

2), presentation of the audio content by HMD 110 may cease at user location 151-3. However, if presentation device 120 is not outputting the audio content because no other user or person is present, the audio content may not cease being output by HMD 110 until user 150 is facing presentation device 120 at user location 151-5.

Figure 4:
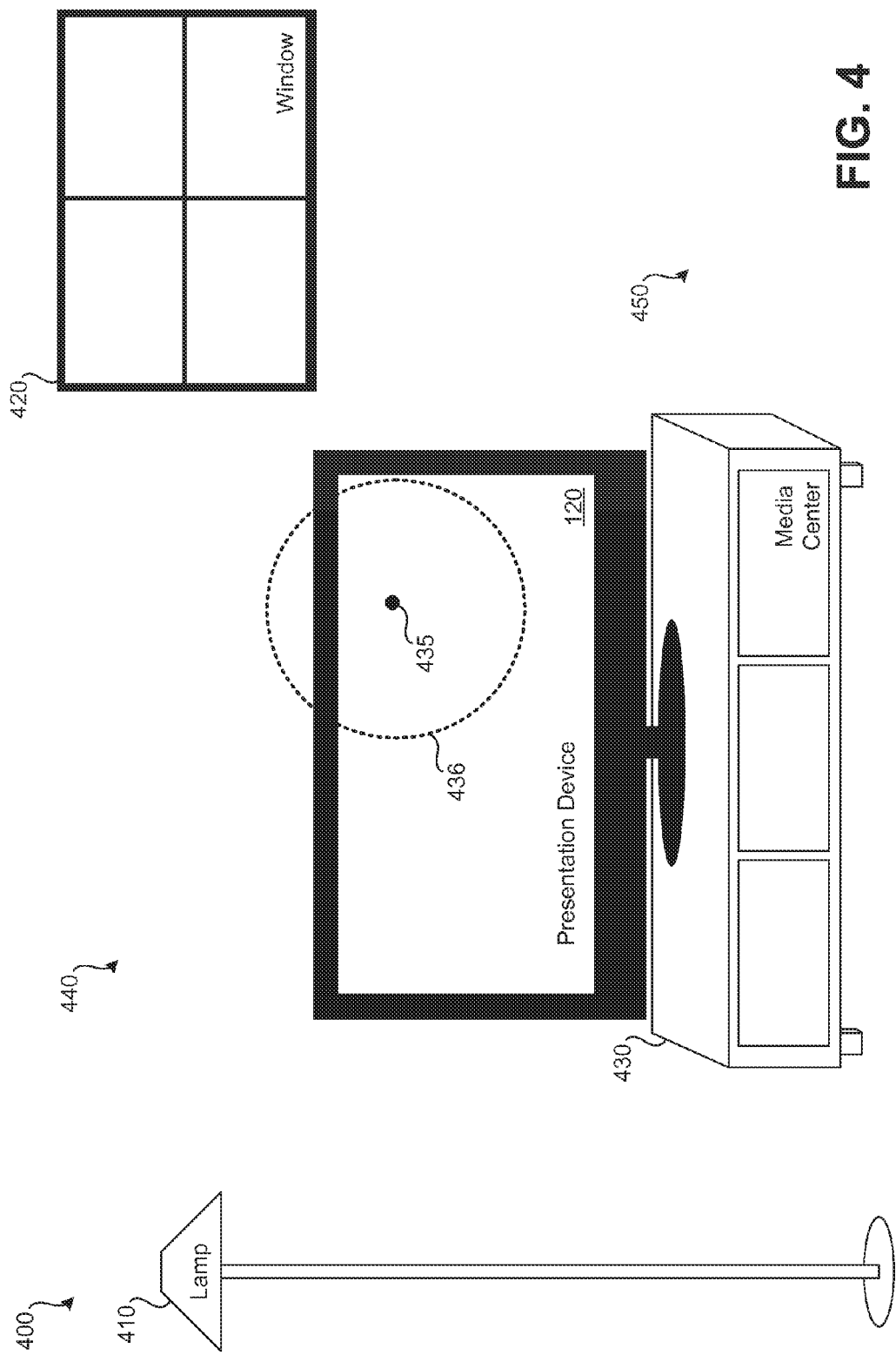
FIG. 4 illustrates an embodiment of a point-of-view of an HMD that may determine whether a user may be facing and hence possibly viewing a presentation device based, at least in part, on a measured color temperature, in accordance with certain example implementations.

Presenting user 150 with the video content via HMD 110 may be at least partially dependent on user 150 facing away from presentation device 120. One or more other conditions may also be required to be satisfied, such as a threshold period of time elapsing. FIG. 4 illustrates an embodiment 400 of a point-of-view of HMD 110 that determines whether user 150 may be viewing a presentation device based on a measured and/or calculated color temperature. Embodiment 400 may represent an image of a scene that user 150 is facing, all or part of the image being captured by camera 115. This image may be analyzed by color temperature sensor 116, one or more processors, and/or the like or some combination thereof. Various forms of devices may present different color temperature light. By way of example, lamp 410, which may use incandescent, LED, fluorescent, halogen, or some other form of lighting intended to produce yellow light, similar to natural lighting. Recessed or other forms of installed home lighting products may tend to have lighting characteristics similar to lamp 410. Window 420 may allow natural light from the sun to enter the scene captured in the age. All of these sources may tend to produce light below a threshold color temperature. Objects within the scene that do not emit their own light may tend to reflect light from either lamp 410 or window 420. Therefore, since the light is reflected, media center 430, wall 440, floor 450, and any other objects that may not omit light in the scene may be expected to have color temperature characteristics similar to the light emitted from lamp 410 and window 420.

Presentation device 120, as compared to lamp 410 and window 420, may under certain conditions emit light that may be different (e.g., having a significantly higher color temperature light) under certain conditions. Therefore, light emitted from presentation device 120, when analyzed by color temperature sensor 116 and/or the like of HMD 110, may likely be different (e.g., having a higher color temperature) from the object(s) reflecting light from lamp 410 or window 420 (or lamp 410 or window 420 themselves).

The color temperature measurement may be made directly on the scene in front of HMD 110 which user 150 is facing, or may be made using an image captured by camera 115. In some embodiments the mean, median, or maximum color temperature of the entire scene may be used to determine whether user 150 may or may not be facing presentation device 120. In some embodiments, rather than measuring the entire scene, point 435, which may be one pixel or a group of pixels, at the center of the captured image may be used. In certain implementations, point 435 may represent where a user may likely be looking when one or both of a user's eyes are facing forward in the same direction as his head— that is, the user's eyes are not glancing up, down, left, or right. In the illustrated embodiment, since point 435 falls on presentation device 120, the measured color temperature may be based on light emitted from presentation device 120. In other embodiments, a larger region than point 435 may be used. Region 436 may be a group of multiple pixels centered or otherwise grouped around a likely center of a user's vision (e.g., the center of an image captured by camera 115). The mean, median, or maximum color temperature may be used for region 436 to determine whether the user may or may not be facing (and potentially be viewing) presentation device 120. In the illustrated example, since the majority of region 436 would capture light directly emitted from presentation device 120, it may be determined/deemed that HMD 110 (and hence user 150) is facing presentation device 120.

In some embodiments, point 435 or region 436 is fixed to the center of captured images. In other embodiments, the direction in which a user's 150 eyes are glancing may be determined such that point 435 or region 436 may be more accurately placed based on where user's 150 eyes may be focusing.

To determine whether or not a measured (and, possibly, calculated) color temperature corresponds to a presentation device, the measured and calculated color temperature may be compared with one or more reference color temperature(s). In some embodiments, a reference color temperature may be fixed. Such a reference color temperature may, for example, define a color temperature of which higher color temperatures are typically related to presentation devices and lower color temperatures are typically related to natural and artificial lighting sources, such as lamp 410 and natural sunlight through window 420. For example, the user may specify a type of presentation device (e.g., LCD, LED) that is associated with a predefined reference color temperature. In other embodiments, the reference color temperature may be user-defined. For example, the color temperature range of 5500K to 10500K may be user defined or predefined in the HMD, such a range typically corresponding to light emitted by a presentation device. In some embodiments, the reference color temperature may be adjusted based on observed color temperature characteristics measured by HMD 110. For example, if HMD 110 is aware that user 150 is facing presentation device 120, an accurate color temperature measurement of presentation device 120 may be made for future reference. Similar measurements may be made for other lighting sources, such as lamp 410. Therefore, if the color temperature values measured are nearly matches of the previously measured color temperature of presentation device 120, it may be assumed that the user is facing presentation device 120.

It should be understood that color temperature measurements may be taken into consideration along with other pieces of data for determining whether or not user 150 is facing presentation device 120 while wearing HMD 110. For instance, the location of HMD 110, audio captured from the environment of HMD 110, and/or the orientation of HMD 110 may be additional factors taken into consideration to determine whether user 150 is facing presentation device 120.

Figure 5:
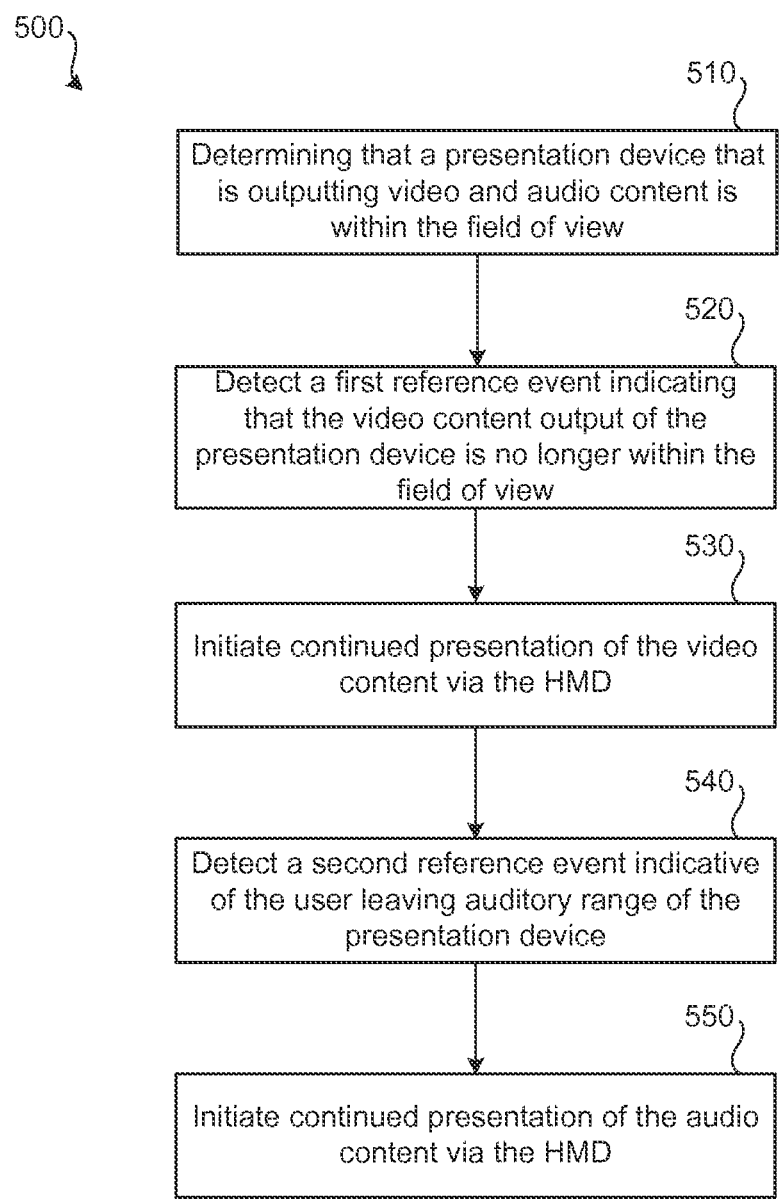
FIG. 5 illustrates an embodiment of a method for managing content presentation in instances wherein it is determined that a user of an HMD may not be facing a presentation device, in accordance with certain example implementations.

Various methods may be performed using the embodiments detailed in relation to FIGS. 1-4. FIG. 5 illustrates an embodiment of a method 500 for managing content presentation when a user is turned away from a presentation device. Method 500 may be performed using various components of system 100 or some other system configured to manage the presentation of content. At least some blocks of method 500 may be performed using HMD 110 or some other form of HMD. A presentation management system 140, which may be incorporated as part of the HMD, may also perform some blocks of method 500. Presentation management system 140 may also be part of a presentation device such as presentation device 120, or may be a standalone device, such as presentation management system 140 as illustrated in system 100 of FIG. 1. The presentation device and/or a network may also perform blocks of method 500.

At block 510, it may be determined that, for an HMD configured to permit a field of view of at least a portion of a surrounding environment, a presentation device that is outputting video content and audio content is within the field of view. Here, the "field of view" can refer to the field of view that a user wearing the HMD may experience. Thus, for example, a field of view may correspond to that which a user wearing the HMD may be able to view either directly (e.g., through a lens, an opening, etc.) and/or indirectly (e.g., via one or more cameras, displays, projectors, etc. of the HMD) of a surrounding environment. It should be understood that such a field of view may vary depending on the HMD's design and/or user fitment. In certain instances some direct and indirect portions of an environment within a field of view of the HMD may, at times, include the same or similar content. For example, in certain instances an HMD may allow a user to view a portion of an environment in front of them directly (e.g., through a lens or opening) and all or part of that same portion of the environment may be captured by a camera and replayed by a display or projector of the HMD. The field of view may be used in certain implementations to help determine whether a user of the HMD may be facing a presentation device. In some embodiments, there may be additional or alternative techniques for determining the user may be facing a presentation device. Referring to system 100 of FIG. 1, block 510 may include user 150 using (and wearing) HMD 110 while viewing presentation device 120, which is outputting video content via video presentation module 121 and audio content via audio presentation module 122. Block 510 may involve performing a color temperature analysis as described in relation to FIG. 4 and method 900 of FIG. 9. Further other was of performing an analysis to determine if the user may be facing the presentation device may also be performed, either in alternate or in combination with the color temperature analysis. Therefore, means for performing block 510 can include HMD 110, network 130, and/or presentation device 120. As part of block 510, it may be determined whether certain content may be in the field of view of the HMD (e.g., and inferably viewable by the user). Having this data may allow presentation of the same content via the user's HMD, e.g., as previous described.

At block 520, a first reference event may be detected, indicating the video content output of the presentation device is no longer within the field of view. The reference event at block 520 may be a color temperature analysis that indicates the user may no longer be able to view the presentation device within the field of view. Either in addition or in alternate, other factors may be assessed to determine whether the user is likely facing the presentation device, such as the location of the HMD, whether the HMD is moving, the orientation of the HMD, analysis of images captured by the HMD, user input, an amount of the user turning away or possibly looking away from the presentation device, and/or other factors. Means for performing block 520 can include HMD 110, network 130, and/or presentation device 120.

At block 530, in response to the first reference event at block 520 being detected, continued presentation of the video content may be initiated at the HMD. Therefore, although the user has turned away from the presentation device, presentation of the video content continues on the user's HMD. While the video content begins being presented to the user via the HMD at block 530, audio content may not be presented via the HMD. Therefore, the user may be able to view the video content via the HMD while hearing the audio content from the presentation device rather than the HMD. Presentation of the video content on the HMD may be synchronized such that the video content being presented by the FIND is synchronized with the audio content being output by the presentation device. Therefore, if the presentation device is still outputting video content, the video content being output by the presentation device substantially matches the video content being presented to the user by the HMD. Continued presentation of the video content being initiated by the HMD may involve the video fading in (e.g., increasing in brightness) on the HMD, thus causing the video content to gradually appear in the user's field-of-sight on the HMD. Alternatively, the video content may immediately be presented without a fading in period. If a fading in period is present, the amount of time to fade in may be user-defined. The continuity of the video content during the transition from the presentation device to the HMD may be managed by a presentation management system. For instance, the presentation management system may ensure that the same video content is transferred for presentation to both devices (or just the HMD, continuing from the appropriate point in the video content) in response to the first reference event. Means for performing block 530 can include HMD 110, network 130, and/or presentation management system 140.

At block 540, a second reference event indicative of the user leaving the auditory range of the presentation device may be detected. The second reference event may occur some amount of time after the first reference event. Therefore, at least a period of time during which the HMD is only presenting the video content may be present. The second reference event may be based on a distance between the HMD and the presentation device being determined. That is, it may be assumed that the auditory range of the presentation device has been exceeded when a certain distance threshold is met. In some embodiments, measurements of the auditory environment of the HMD may be taken to determine if audio content emitted from the presentation device is sufficiently loud at the HMD. Therefore, the current volume of the presentation device outputting audio content may affect where (and when) the second reference event occurs. It is possible that if the user returned to viewing the presentation device before exceeding the auditory range of the presentation device, the HMD would not output the audio content. Means for performing block 540 can include MD 110 and/or presentation device 120.

At block 550, in response to the second reference event being detected at block 540, presentation of the audio content may be initiated at the HMD. The audio content presented by the HMD may be synchronized with the video content already being presented by the HMD. As with the video content, the audio content may be faded in (e.g., gradually increased in value) such that it gradually begins being output by the HMD. The fading-in may be based on a default time period, a user defined time period, or based on the measured volume of the audio content still being received by the HMD from the presentation device. As such, the second reference event may trigger the audio to begin being faded in from a first volume (which may be no output audio at all) to a second, louder volume. Following block 550, the user may be presented with both the video content and the audio content via the HMD. This video content and audio content may be a continuation of the video content and audio content that the user was previously viewing at block 510. Therefore, the user may be able to experience seamless or near seamless playback of the content while switching from using the presentation device to the HMD that the user is using/wearing. The continuity of the audio content during the transition from the presentation device to the HMD may be managed by a presentation management system. For instance, the presentation management system may ensure that the same audio content is transferred for presentation to both devices (or just the HMD) in response to the second reference event. Means for performing block 550 can include HMD 110, network 130, and/or presentation management system 140.

Method 500 does not focus on how the presentation device performs in response to the user (and HMD) not looking at the presentation device and leaving auditory range of the presentation device. Details of such an arrangement are provided in relation to method 600 of FIG. 6.

Figure 6:
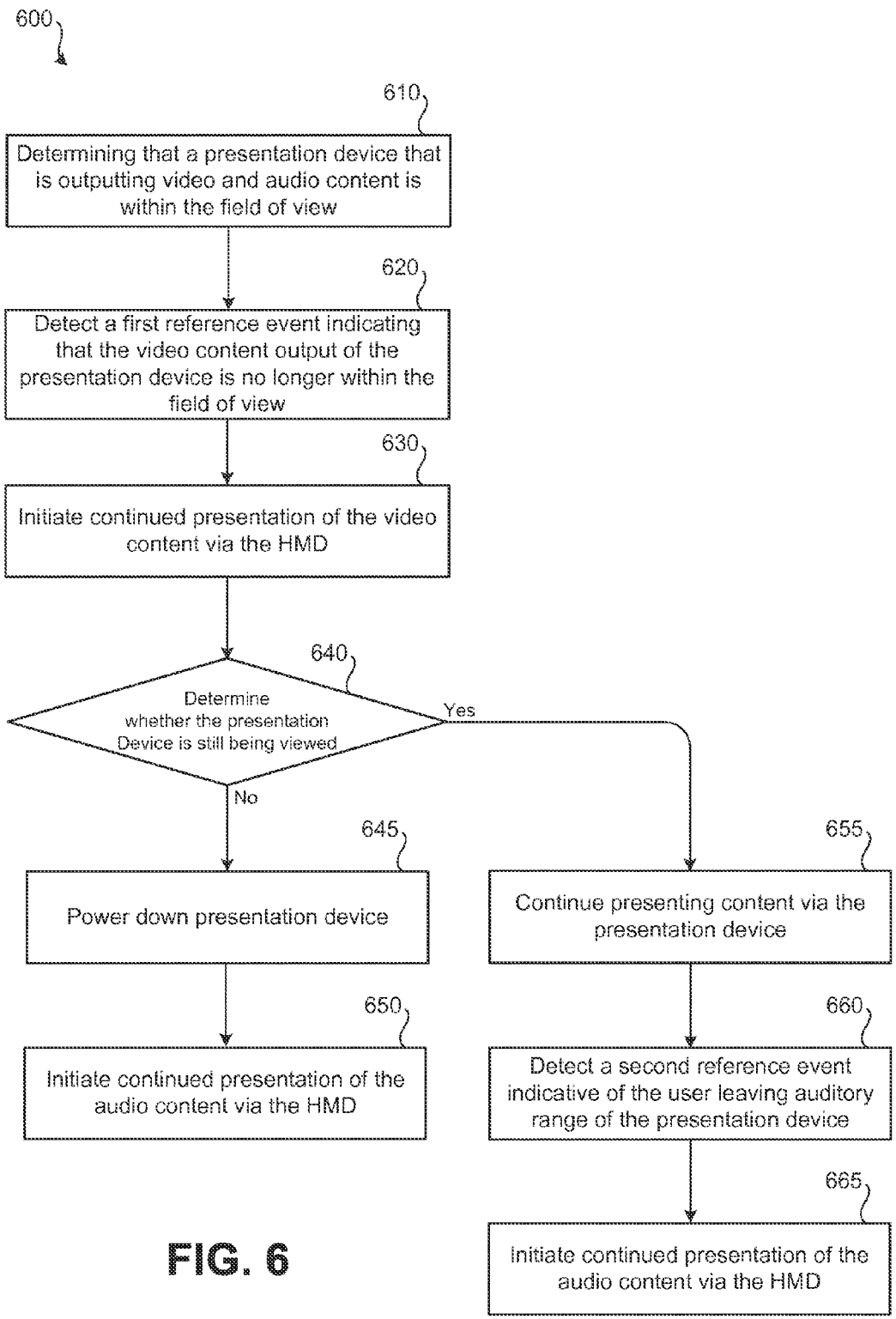
FIG. 6 illustrates another embodiment of a method for managing content presentation in instances wherein it is determined that a user of an HMD may not be facing a presentation device but another person or user may be viewing the presentation device, in accordance with certain example implementations.

FIG. 6 illustrates another embodiment of a method 600 for managing content presentation when a user is facing or possibly looking away from a presentation device and another person (or user) may be viewing the presentation device. Method 600 may be performed using various components of system 100 or some other system configured to manage the presentation of content. Blocks of method 600 may be performed using HMD 110 or some other form of HMD. A presentation management system 140, which may be incorporated as part of the HMD, may also perform blocks of method 600. Presentation management system 140 may also be part of a presentation device such as presentation device 120, or may be a stand-alone device, such as presentation management system 140 as illustrated in system 100 of FIG. 1. The presentation device and/or a network may also perform blocks of method 600.

At block 610, it may be determined that, for an HMD configured to permit a field of view of at least a portion of a surrounding environment, a presentation device that is outputting video content and audio content is within the field of view. Referring to system 100 of FIG. 1, block 610 may include user 150 using (and wearing) HMD 110 while possibly also be able to view presentation device 120, which is outputting video content via video presentation module 121 and audio content via audio presentation module 122. A second person, such as person 160, may be able to view presentation device 120. Alternatively or additionally, another user using another HMD may be able to view presentation device 120. Block 610 may involve performing a color temperature analysis as described in relation to FIG. 4 and method 900 of FIG. 9. Further, other ways of performing an analysis to determine if user 150 is facing the presentation device (e.g., such that all or part of the video content of presentation device 120 falls with the field of view of HMD 110) may also be performed, e.g., either in alternate or in combination with the color temperature analysis. Therefore, means for performing block 610 can include HMD 110, network 130, and/or presentation device 120. As part of block 610, it may be determined what content may be available for viewing by user 150 via HMD 110. Having this data may allow presentation of the same content via HMD 150, e.g., as described in the previous examples. Blocks 620 and 630 may be conducted substantially similarly to blocks 520 and 530, respectively, of method 500 of FIG. 5.

At block 640, a determination may be made as to whether the presentation device is still viewable, such as by a person other than the user of the HMD. In some instances, this person may be a second user wearing a second HMD. The determination of block 640 may be performed by a variety of devices. For instance, HMD 110 may perform the determination. Alternatively, presentation device 120 may perform the determination. In some embodiments, HMD 110 and presentation device 120 may exchange information such that the decision is made by one of these devices. In some embodiments, presentation management system 140 may be involved in performing the determination. Whether someone else, either another user or person, is also viewing the presentation device may affect how operation of the presentation device is handled going forward. For instance, if no one else is deemed to be present and possibly viewing the presentation device, it may not be efficient (e.g., due to power consumption, wear on the device) to have it presenting content. Of course, if another user or person is deemed to be present and possibly viewing the presentation device, powering down the presentation device would not be desirable. The determination at block 640 may be based on other HMD's being detected in the vicinity of the presentation device (e.g., based on location, color temperature analysis, messaging, and/or some other form of determining if a user may be present and possibly viewing the presentation device). While users may be wearing an HMD, some other persons may not. As such, a device such as viewer detector 123, which may or may not be part of presentation device 120, may be used to determine if one or more persons may be facing and/or possibly viewing presentation device 124 are at least in the vicinity of presentation device 120. Means for performing block 640 can include HMD 110, network 130, viewer detector 123, and/or presentation device 120.

If, at block 640, it is determined that no other user or person is viewing the presentation device, at least the video presentation module of the presentation device may be powered down (or otherwise undergo a change in an operational mode) at block 645. In some embodiments, the entire presentation device may be powered down such that the presentation device does not present either audio or video content. In such embodiments, continued presentation of the audio content may be continued to the user via the HMD at block 650. In other embodiments, only the video portion of the presentation device may be powered down at block 645, and the audio content may be continued to be output by the presentation device. At block 645, a command may be sent to the presentation device by HMD 110 or presentation management system instructing it to power down, either completely or power down the video presentation module of the presentation device. In embodiments involving only a power down of the video presentation module of the presentation device, presentation of the audio content by the presentation device may be handled in accordance with blocks 660 and 665. In these embodiments, once the audio content is presented via the HMD to the user, the presentation device would be powered down for both audio and video content presentation. Means for performing block 645 can include HMD 110, network 130, presentation device 120, and/or presentation management system 140.

If, instead, at block 640, it is determined that another user or person is viewing the presentation device, at block 655, the audio and video content may continue to be presented by the presentation device. Therefore, at block 655, the HMD may be outputting the video content to the user while the same video content is also being output by the presentation device to another user and/or person who may be facing and/or possibly viewing the presentation device. Means for performing block 655 can include presentation device 120.

At block 660, a second reference event indicative of the user wearing the HMD leaving the auditory range of the presentation device may be detected. The second reference event may occur subsequent to the first reference event. Therefore, at least a period of time during which the HMD is only presenting the video content may be present (while the presentation device is still outputting the video and audio content). The second reference event may be based on a distance between the HMD and the presentation device being determined. That is, it may be assumed that the auditory range of the presentation device has been exceeded when a certain distance threshold is met. In some embodiments, measurements of the auditory environment of the HMD may be taken to determine if audio content emitted from the presentation device is sufficiently loud at the HMD. Therefore, the current volume of the presentation device outputting audio content may affect when and where the second reference event occurs. It is possible that, if the user returned to viewing the presentation device before exceeding the auditory range of the presentation device, the HMD would not output the audio content. Means for performing block 660 can include HMD 110, presentation management system 140, network 130, and/or presentation device 120.

At block 665, in response to the second reference event being detected at block 660, continued presentation of the audio content may be initiated at the HMD. The audio content presented by the HMD may be synchronized with the video content already being presented by the HMD. As with the video content, the audio content may be faded in such that it gradually begins being output by the HMD. The fading may be based on a default time period, based on the user defined time period, or based on the measured volume of the audio content still being received by the HMD from the presentation device. Therefore, following block 665, the user may be presented with both the video content and the audio content via the HMD (e.g., while the other user or person may still be able to view the same video content and hear the same audio content from the presentation device). This video content and audio content may be a continuation of the video content and audio content that the user was previously presented at block 610. Therefore, the user may be able to experience near seamless playback of the content while switching from using the presentation device to the HMD that the user is wearing. The continuity of the audio content during the transition from the presentation device to the HMD may be managed by a presentation management system. For instance, presentation management system 140 may ensure that the same audio content is transferred for presentation to both devices (or just the HMD) in response to the second reference event. Means for performing block 665 can include HMD 110, network 130, and/or presentation management system 140.

Figure 7:
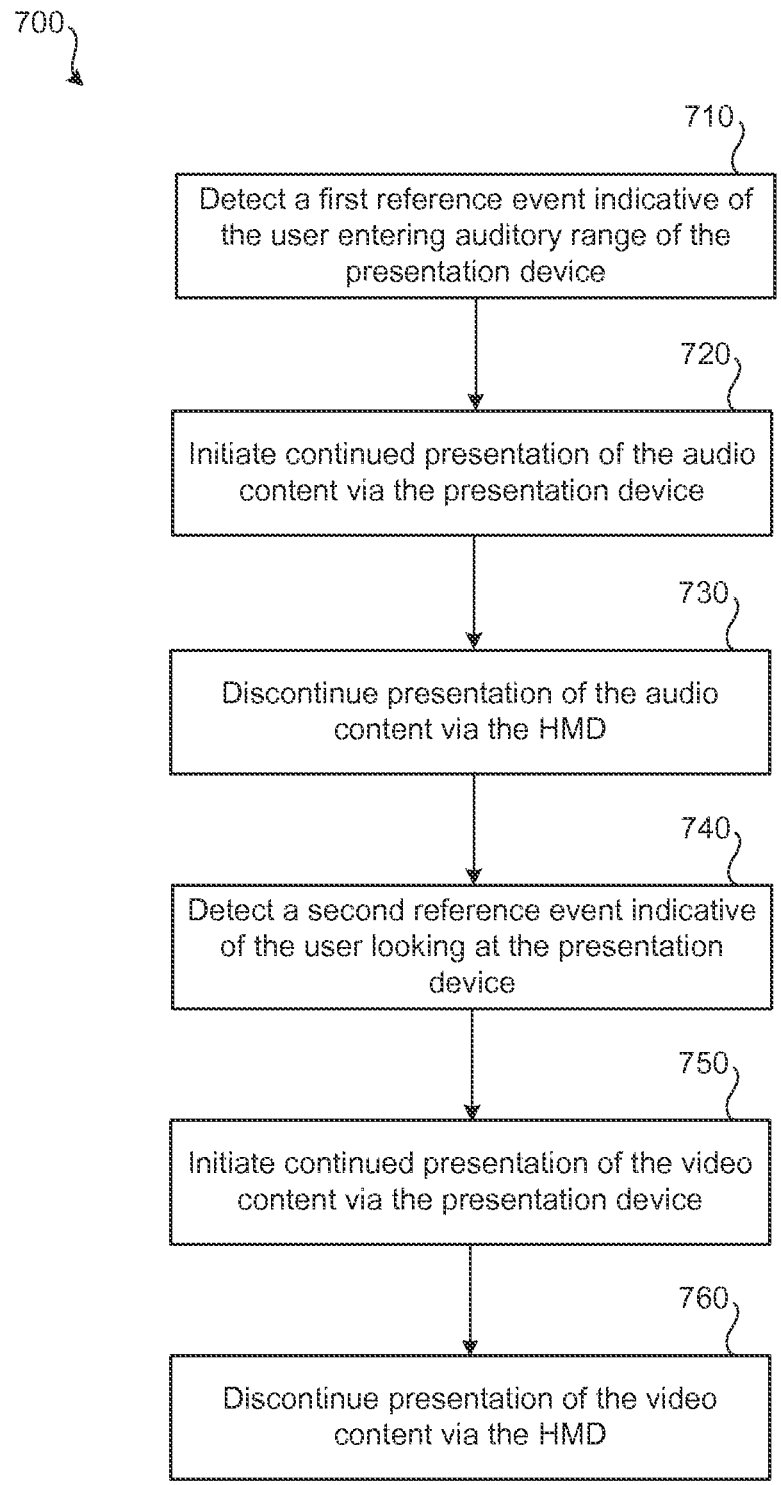
FIG. 7 illustrates an embodiment of a method for managing content presentation in instances wherein it is determined that a user of an HMD may be returning to possibly viewing content on a presentation device and another person or user may not be viewing the presentation device, in accordance with certain example implementations.

FIG. 7 illustrates an embodiment of a method for managing content presentation when a user is returning to viewing content on the presentation device and another person or user is not viewing the presentation device. Method 700 may be performed using system 100 or some other system configured to manage content presentation. Generally, each block of method 700 may be performed using the components of system 100. For instance an HMD may perform at least some blocks of method 700. A presentation management system 140, which may be incorporated as part of the HMD performing method 700, may also perform blocks of method 700. Presentation management system 140 may also be part of a presentation device such as presentation device 120, or may be a stand-alone device, such as presentation management system 140 as illustrated in system 100 of FIG. 1. Generally, method 700 can be understood as corresponding to a situation similar to floor plan 300 of FIG. 3.

At block 710, a first reference event may be detected that is indicative of the user (re)entering auditory range of the presentation device. When block 710 occurs, the user may have been able to view video content and may have been able to listen to audio content via an HMD. The first reference event at block 710 may involve determining that the presentation device for which the user is entering the auditory range is presenting (or is eligible to present) the same audio content as the content which the user may be listening to via the HMD. For example, method 700 may be performed in a situation after method 500 has been performed. For instance, if the user previously left a room in which a presentation device was presenting the audio and video content, in method 700, the user may be in the process of returning to continue viewing and listening to the content by the presentation device. Detection of the first reference event may be based on distance between the HMD and the presentation device, a predefined location being reached by the HMD, user input, and/or volume measurements of the auditory environment of the HMD in which audio is being received from the presentation device. Means for performing block 710 can include HMD 110, presentation management system 140, network 130, and/or presentation device 120.

At block 720, continued presentation of the audio content may be initiated via the presentation device. The continued presentation of the audio content of block 720 may be based upon the first reference event being detected at block 710. This may involve the audio content being output at a low volume and gradually increased to a louder volume (e.g., fading in). In some embodiments, the volume output by the presentation device may be contingent on the last volume set by a user or person at the presentation device. While the presentation device may begin continued presentation of the audio content, video content may not be output by the presentation device. Therefore, only audio content may be output by the presentation device at block 720. At block 730, which may occur concurrently with block 720, the audio content may cease being output to the user via the HMD. This may involve the volume of the audio content output by the HMD gradually decreasing (e.g., fading out). Therefore, as the volume output by the presentation device fades in, the volume output by the HMD may fade out (e.g., decrease in volume). At block 730, the HMD may continue to output the video content corresponding to the audio content output by the presentation device. The audio content being output by the presentation device instead of the HMD may involve the data related to the audio content being transmitted to the presentation device by a presentation management system. Means for performing blocks 720 and 730 can include HMD 110, presentation management system 140, network 130, and/or presentation device 120.

At block 740, a second reference event may be detected that is indicative of the user facing and possibly viewing the presentation device. When block 740 occurs, the user may have been facing and possibly viewing video content via the HMD while possibly listening to audio content via the presentation device. The second reference event at block 740 may involve determining that the presentation device is with a field of view of the HMD and as such possibly viewable by the user. In other embodiments, it may be desirable to initiate continued presentation of the video content at the presentation device a short time before the user begins to face and possibly view the presentation device. Detection of the second reference event may be based on distance between the HMD and the presentation device, a predefined location being reached by the HMD, user input, and/or the user being determined to be looking at the presentation device. If the presentation device needs a warm-up or start-up sequence to complete, the sequence may be started ahead on the second reference event such that the presentation device is ready to output video when the second reference event occurs. Means for performing block 740 can include HMD 110, presentation management system 140, network 130, and/or presentation device 120.

At block 750, continued presentation of the video content may be initiated at the presentation device. The continued presentation of block 750 may be contingent upon the second reference event being detected at block 740. For a time, the video content may be presented by the presentation device and by the HMD. This may be especially the case when the second reference event triggers presentation of the video content to begin at the presentation device prior to the user facing and possibly viewing the presentation device. Therefore, at block 750, the user may still be facing and possibly viewing the video content via the HMD or may have begun to view the presentation device. At block 750, the presentation device is outputting both the video content and the audio content. Means for performing block 750 can include HMD 110, presentation management system 140, network 130, and/or presentation device 120.

At block 760, presentation of the video content via the HMD may be discontinued. Block 760 may be performed in response to continued presentation being initiated at block 750 or may be based upon another reference event occurring. For example, a third reference event that may be indicative of the user facing and possibly viewing the presentation device, such as a color temperature analysis and/or location and/or orientation analysis, may be performed. The video content may cease being presented at the HMD by being faded out (e.g., decreased in brightness) or cease being presented without fading. Following block 760, continued presentation of the video and audio content is being performed via the presentation device and the HMD is not presenting either the audio content or the video content. Means for performing block 760 can include HMD 110, presentation management system 140, network 130, and/or presentation device 120.

Figure 8:
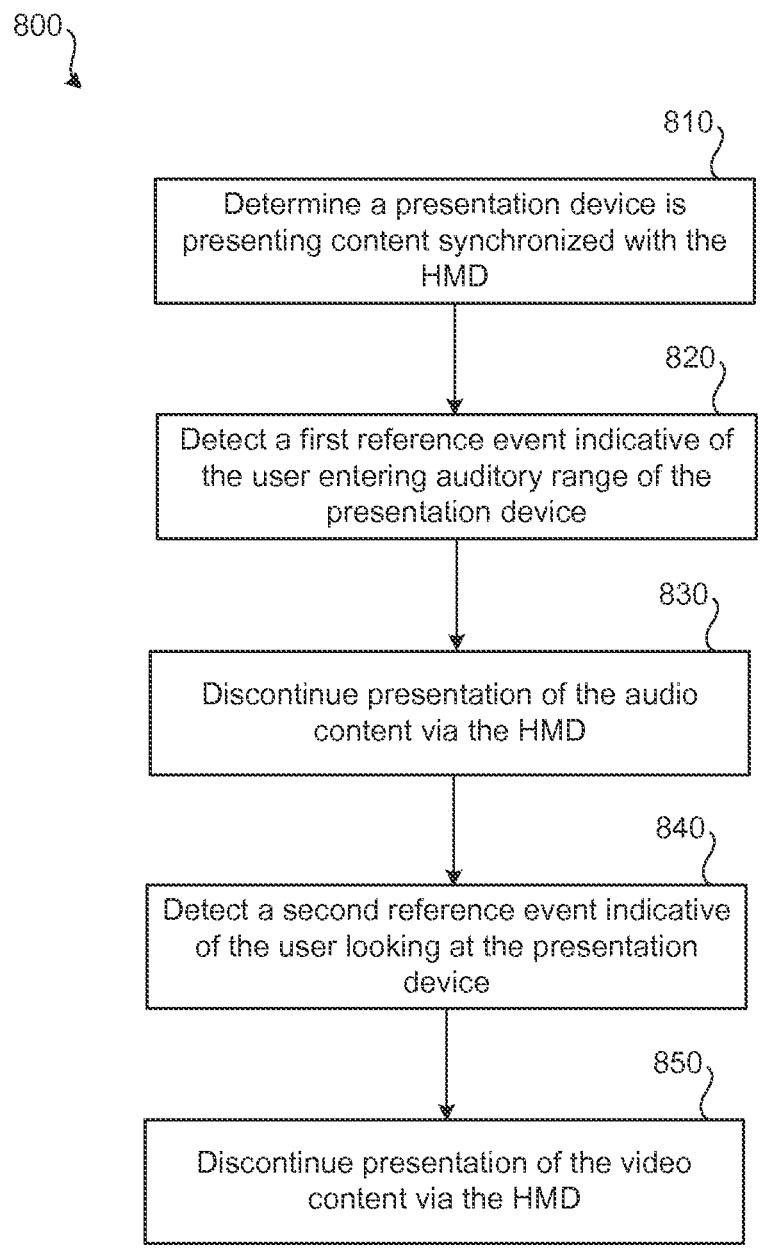
FIG. 8 illustrates an embodiment of a method for managing content presentation in instances wherein it is determined that a user of an HMD may be returning to possibly viewing content on a presentation device and another person or user may already be viewing the presentation device, in accordance with certain example implementations.

FIG. 8 illustrates an embodiment of a method for managing content presentation when a user is returning (or otherwise going) to view content on the presentation device and another person or user is already facing and possibly viewing the same content on the presentation device. As an example, method 800 may occur when a user is returning to the room where the presentation device is located after leaving the room some time earlier during the presentation of the content. For example, method 800 may occur sometime after method 600 is performed. Method 800 may be performed using system 100 or some other system configured to manage content presentation. Generally, each block of method 700 may be performed using the components of system 100. For instance, an HMD may perform at least some blocks of method 700. A presentation management system 140, which may be incorporated as part of the HMD, may also perform blocks of method 800. Presentation management system 140 may also be part of a presentation device such as presentation device 120, or may be a stand-alone device, such as presentation management system 140 as illustrated in system 100 of FIG. 1. Generally, method 700 can be understood as corresponding to a situation similar to floor plan 300 of FIG. 3.

At block 810, it may be determined that the presentation device is presenting the same content and the same content is generally synchronized with the content being presented by the HMD. If a small amount of variance is present between the synchronization of the HMD and the presentation device, playback at one of the devices may be altered by the presentation management system until synchronization is achieved. For example, playback at the HMD may be slowed down or sped up until synchronization is achieved. As an example of how block 810 could be performed, a presentation management system may compare data being streamed to the HMD and the presentation device. If the data matches, the same content may be presented generally in synchronization at both devices. Means for performing block 810 can include HMD 110, presentation management system 140, network 130, and/or presentation device 120.

At block 820, a first reference event may be detected that is indicative of the user (re)entering auditory range of the presentation device. Blocks 820 and later may only be performed if the content of block 810 is determined to be generally synchronized. When block 820 occurs, the user may have been facing and possibly viewing video content and possibly listening to audio content via an HMD. Detection of the first reference event may be based on a distance between the HMD and the presentation device, a predefined location being reached by the HMD, a step count (e.g., dead reckoning), user input, and/or volume measurements of the auditory environment of the HMD in which audio is being received from the presentation device. Means for performing block 820 can include HMD) 110, presentation management system 140, network 130, and/or presentation device 120.

At block 830, the audio content may cease being output to the user via the HMD. Block 830 may occur in response to block 820 in which the first reference event was detected. The user may continue to hear the audio content because it is also being output by the presentation device. This may involve the volume of the audio content output by the HMD gradually decreasing (e.g., fading out). At block 830, the HMD may continue to output the video content corresponding to the audio content output by the presentation device. Means for performing block 830 can include HMD 110, presentation management system 140, network 130, and/or presentation device 120.

At block 840, a second reference event may be detected that is indicative of the user viewing the presentation device. Block 840 may occur some amount of time after block 820. When block 840 occurs, the user may have been able to view video content via the HMD while possibly listening to audio content via the presentation device. The second reference event at block 840 may involve determining that the presentation device is possibly being viewed. Detection of the second reference event may be based on a distance between the HMD and the presentation device, a color temperature analysis, a predefined location being reached by the HMD, user input, and/or the user being determined to be looking at the presentation device. Means for performing block 840 can include HMD 110, presentation management system 140, network 130, and/or presentation device 120.

At block 850, presentation of the video content via the HMD may be discontinued. Block 850 may be performed in response to the second reference event of block 840. The video content may cease at the HMD by being faded out (e.g., decreased in brightness') or by being stopped without fading. Following block 850, continued presentation of the video and audio content is being performed via the presentation device and the HMD is not presenting either the audio content or the video content. Therefore, the user of the HMD and the one or more other users/persons in the room may be able to view the same content via the presentation device. Means for performing block 850 can include HMD 110, presentation management system 140, network 130, and/or presentation device 120.

While the above embodiments of methods have focused on a user approaching or leaving the vicinity of a presentation device, it should be understood that these methods may be combined for use at more than one presentation device. For instance, a user may begin by watching content via an in-vehicle entertainment device, presentation is transitioned to the user's HMD; then, another presentation device; such as a television, is approached by the user, to which presentation is then transitioned. Therefore, for example, method 500 may be performed followed by, for example, method 800 as the user approaches a different presentation device.

As another situation in which such methods could be employed, a user may enter a restaurant, bar, or other public location where content may be presented response to content being viewed via the HMD being presented on-screen at the public location, the HMD may stop presenting video content, but may present associated audio content (if such audio content is inaudible in the public location).

Figure 9:
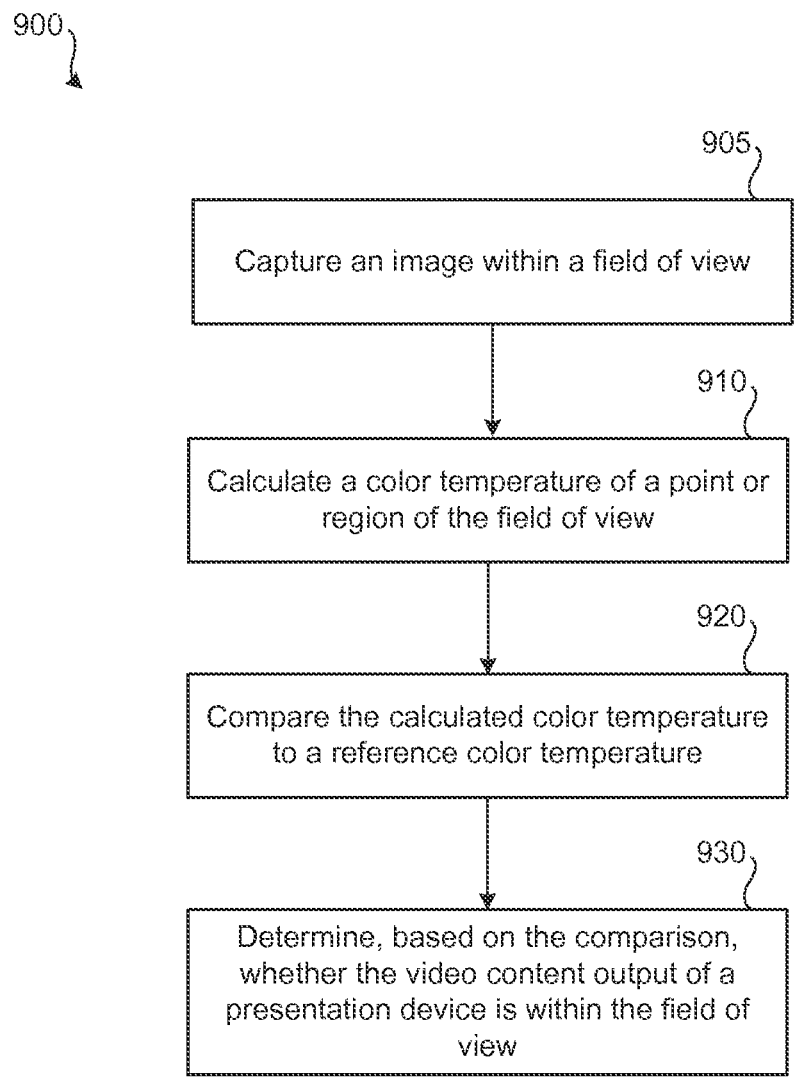
FIG. 9 illustrates an embodiment of a method for use in determining whether a user of an HMD may be facing and hence possibly viewing a presentation device based, at least in part, on a measured color temperature, in accordance with certain example implementations.

FIG. 9 illustrates an embodiment of a method for determining if a user is viewing a presentation device using a measured color temperature. Method 900 may be used to determine whether a user is likely facing and possibly viewing a presentation device, such as a television, tablet computer, in-vehicle entertainment system, etc. Method 900 may be performed at an HMD, such as HMD 110 of FIG. 1. Color temperature may be measured based on one or more captured images. In some embodiments, a separate color temperature sensor may be used. In some embodiments, the blocks of method 900 may be performed by an HMD. In other embodiments, at least some of the processing may be performed remote from the HMD, such as at presentation management system 140 of FIG. 1.

At block 905, an image may be captured within a field of view. As previously indicated, the "field of view" here can refer to the field of view that a user may experience while using/wearing the HMD. Referring to system 100, one or more cameras (represented by camera 115) may capture one or more images of the HMD's field of view, which can be expected to capture at least a portion of the user's view of a scene within an environment. In some embodiments, color temperature sensor 116 of HMD 110 may capture color temperature information directly from the field of view (that is, separate from images captured by camera 115). Means for performing block 905 include an HMD, such as HMD 110 of FIG. 1.

At block 910, if the color temperature is to be determined from a captured image, a color temperature may be calculated from the captured image of block 905. In determining the color temperature from a captured image, the color temperature may be determined based upon a stream of data from an image sensor (e.g., an RGB sensor) of the HMD) for a time period (e.g., x seconds) every so often (e.g., twice per minute or at some other frequency). In some embodiments, the color temperature of the entire image is measured or calculated. In some embodiments, only a point or region, such as in the middle of the image or point in the image that corresponds with the user facing and possibly looking directly ahead, has its color temperature measured or calculated. In some embodiments, the user's gaze is analyzed to determine a point or region within the field of view where a user is likely focusing. In such embodiments, this point or region may be used for the color temperature measurement or calculation. If a color temperature sensor was used at block 905 to directly capture color temperature information from field of view, the color temperature may be analyzed at block 910 for a particular point or region in the user's field of view. Whether an image is analyzed or color temperature information is directly captured from the environment, if a region is used, the mean, median, a maximum, a weighted average, or some other analysis calculation may be used for calculating the color temperature of the region. In some embodiments, color temperature sensor 116 may be in the form of a color analysis engine, which may analyze the color temperature of images captured by camera 115. As such, a specialized processor may be used as a color analysis engine or a general-purpose processor may be configured to execute instructions that function as the color analysis engine. Means for performing block 910 include an HMD, such as HMD 110, or some other remote device that includes one or more processors to perform the calculation.

At block 920, the calculated color temperature of block 910 may be compared to a reference color temperature. The reference color temperature may be a predefined value that is used to determine whether or not the user is viewing a presentation device. For example, the reference color temperature may be 5,500 K, such that all measured color temperatures above this value are likely from a presentation device. The reference color temperature may define a range, such as 5,500 K to 10,500 K. In some embodiments, the reference color temperature range may be set by a user. In some embodiments, the reference color temperature may be set, based on a situation where is known that the user is facing and possibly viewing a presentation device. As such, one or more presentation devices that are used by a user may have their color temperature measured such that these values can be used to determine at later times whether the user is facing and possibly viewing one of the presentation devices. In some embodiments, two points or regions within the field of view may be used: one for the color temperature of where the user is likely looking (e.g., the center of the field of view) and a second point or region for the ambient color temperature (e.g., captured from the periphery of the field of view). In certain instances, if the user is deemed to be facing away and thus possibly not looking at a presentation device, the color temperatures of these two points or regions are likely to be similar. If the first point or region has a higher color temperature (e.g., by more than a threshold amount), it may be likely that the user is facing and possibly viewing a presentation device. Means for performing block 920 include an HMD, such as HMD 110, or some other remote device that includes one or more processors to perform the comparison.

At block 930, based upon the comparison of block 920, it is determined whether or not the video content output of a presentation device is within the field of view described in relation to block 905. In some embodiments, in addition to such a determination, a specific presentation device may be identified, such as based upon location and/or color temperature. In some embodiments, if the HMD performs block 930, an indication may be transmitted to presentation management system 140 that indicates whether or not the user of the HMD may be facing and possibly viewing a presentation device and, possibly, an indication of the presentation device being viewed. Means for performing block 930 include an HMD, such as HMD 110, or some other remote device that includes one or more processors to perform the comparison.

It should be understood that at least some of the previously described systems and devices may have the functionality of an integrated computer system. FIG. 10 illustrates an embodiment of a computer system. A computer system as illustrated in FIG. 10 may be incorporated as part of the previously described computerized devices, such as the HMDs, presentation device, and presentation management system. FIG. 10 provides a schematic illustration of one embodiment of a computer system 1000 that can perform various blocks of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, video decoders, and/or the like); one or more input devices 1015, which can include without limitation a mouse, a keyboard, remote control, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing content presentation involving a head mounted display (HMD), wherein the HMD is configured to permit a field of view of at least a portion of a surrounding environment, the method comprising:
    determining, by the HMD, that video content output of a presentation device separate from the HMD is within the field of view, wherein the presentation device outputs the video content and audio content;
    detecting, by the HMD, a first reference event indicating that the video content output of the presentation device is no longer within the field of view, wherein detecting the first reference event comprises:
        measuring, by the HMD, a first color temperature of at least a portion of the field of view;
        comparing the measured first color temperature with a first reference color temperature; and
        based on comparing the measured first color temperature with the first reference color temperature, determining that the first reference event has occurred;
    in response to the first reference event, initiating, by the HMD, continued presentation of the video content via the HMD.

2. The method of claim 1, further comprising:
    after the first reference event, detecting, by the HMD, a second reference event; and
    in response to the second reference event, initiating, by the HMD, continued presentation of the audio content via the HMD, wherein the HMD initiates continued presentation of the audio content at a later time than when the HMD initiates the continued presentation of the video content.

3. The method for managing content presentation involving the HMD of claim 1, wherein determining that the video content output of the presentation device is within the field of view comprises:
    measuring, by the HMD, a second color temperature of at least a portion of the field of view, wherein measuring the second color temperature occurs before or after the measuring of the first color temperature;
    comparing the measured second color temperature with a second threshold color temperature, the second threshold color temperature being the same or different than the first reference color temperature; and
    based on the comparison, determining that the video content output of the presentation device is within the field of view.

4. The method for managing content presentation involving the HMD of claim 2, wherein detecting the second reference event comprises:
    determining a first location of the HMD;
    calculating a distance from the first location to a second location of the presentation device;
    comparing the distance to a threshold distance; and
    based upon comparing the distance to the threshold distance, determining that the second reference event has occurred.

5. The method for managing content presentation involving the HMD of claim 2, wherein detecting the second reference event comprises:

measuring, via a microphone of the HMD, a signal-to-noise ratio of the audio content output by the presentation device;
comparing the measured signal-to-noise ratio of the audio content to a threshold signal-to-noise ratio; and
based upon comparing the measured signal-to-noise ratio of the audio content to the threshold signal-to-noise ratio, determining that the second reference event has occurred.

6. The method for managing content presentation involving the HMD of claim 2, wherein at least five seconds elapse between the first reference event and the second reference event.

7. The method for managing content presentation involving the HMD of claim 2, wherein initiating the continued presentation of the audio content via the HMD comprises fading in the audio content from a first volume to a second, louder volume.

8. The method for managing content presentation involving the HMD of claim 1, wherein initiating the continued presentation of the video content via the HMD comprises fading in a brightness of the video content to be presented via the HMD.

9. A system for managing content presentation via a head mounted display (HMD), wherein the HMD is configured to permit a field of view of at least a portion of a surrounding environment, the system comprising:
memory; and
one or more processors coupled to the memory and configured to:
determine that video content output of a presentation device separate from the HMD is within the field of view, wherein the presentation device outputs the video content and audio content;
detect a first reference event indicating that the video content output of the presentation device is no longer within the field of view, wherein detecting the first reference event comprises:
measuring a first color temperature of at least a portion of the field of view;
comparing the measured first color temperature with a first reference color temperature; and
based on comparing the measured first color temperature with the first reference color temperature, determining that the first reference event has occurred;
in response to the first reference event, initiate continued presentation of the video content via the HMD.

10. The system of claim 9, wherein the one or more processors are further configured to:
after the first reference event, detect a second reference event; and
in response to the second reference event, initiate continued presentation of the audio content via the HMD, wherein the HMD initiates continued presentation of the audio content at a later time than when the HMD initiates the continued presentation of the video content.

11. The system of claim 9, wherein the one or more processors are further configured to:
measure a second color temperature of at least a portion of the field of view, wherein measuring the second color temperature occurs before or after the measuring of the first color temperature;
compare the measured second color temperature with a second threshold color temperature, the second threshold color temperature being the same or different than the first reference color temperature; and
based on the comparison, determine that the video content output of the presentation device is within the field of view.

12. The system of claim 10, wherein the one or more processors are further configured to:
determine a first location of the HMD;
calculate a distance from the first location to a second location of the presentation device;
compare the distance to a threshold distance; and
based upon comparing the distance to the threshold distance, determine that the second reference event has occurred.

13. The system of claim 10, wherein the one or more processors are further configured to:
measure, via a microphone of the HMD, a signal-to-noise ratio of the audio content output by the presentation device;
compare the measured signal-to-noise ratio of the audio content to a threshold signal-to-noise ratio; and
based upon comparing the measured signal-to-noise ratio of the audio content to the threshold signal-to-noise ratio, determine that the second reference event has occurred.

14. The system of claim 10, wherein the one or more processors are further configured to initiate the continued presentation of the audio content via the HMD by fading in the audio content from a first volume to a second, louder volume.

15. The system of claim 9, wherein the one or more processors are further configured to initiate the continued presentation of the video content via the HMD by fading in a brightness of the video content to be presented via the HMD.

16. A system for managing content presentation involving a head mounted display (HMD), wherein the HMD is configured to permit a field of view of at least a portion of a surrounding environment, the system comprising:
means for determining that video content output of a presentation device separate from the HMD is within the field of view, wherein the presentation device outputs the video content and audio content;
means for detecting a first reference event indicating that the video content output of the presentation device is no longer within the field of view, wherein the means for detecting the first reference event comprises:
means for measuring a first color temperature of at least a portion of the field of view;
means for comparing the measured first color temperature with a first reference color temperature; and
means for determining that the first reference event has occurred based on comparing the measured first color temperature with the first reference color temperature;
means for initiating continued presentation of the video content via the HMD in response to the first reference event.

17. The system for managing content presentation involving the HMD of claim 16, further comprising:
means for detecting a second reference event after the first reference event; and
means for initiating continued presentation of the audio content via the HMD in response to the second reference event, wherein
the HMD initiates continued presentation of the audio content at a later time than when the HMD initiates the continued presentation of the video content.

18. The system for managing content presentation involving the HMD of claim 16, wherein the means for determining that the video content output of the presentation device is no longer within the field of view comprises:
   means for measuring a second color temperature of at least a portion of the field of view before or after the measuring of the first color temperature;
   means for comparing the measured second color temperature with a second threshold color temperature, the second threshold color temperature being the same or different than the first reference color temperature; and
   means for determining that a user is viewing the video content output by the presentation device based on the comparison.

19. The system for managing content presentation involving the HMD of claim 17, wherein the means for detecting the second reference event comprises:
   means for determining a first location of the HMD;
   means for calculating a distance from the first location to a second location of the presentation device;
   means for comparing the distance to a threshold distance; and
   means for determining that the second reference event has occurred based upon comparing the distance to the threshold distance.

20. The system for managing content presentation involving the HMD of claim 17, wherein the means for detecting the second reference event comprises:
   means for measuring, at the HMD, a signal-to-noise ratio of the audio content output by the presentation device;
   means for comparing the measured signal-to-noise ratio of the audio content to a threshold signal-to-noise ratio; and
   means for determining that the second reference event has occurred based upon comparing the measured signal-to-noise ratio of the audio content to the threshold signal-to-noise ratio.

21. The system for managing content presentation involving the HMD of claim 17, wherein the means for initiating the continued presentation of the audio content via the HMD comprises means for fading in the audio content from a first volume to a second, louder volume.

22. The system for managing content presentation involving the HMD of claim 16, wherein the means for initiating the continued presentation of the video content via the HMD comprises means for fading in a brightness of the video content to be presented via the HMD.

23. A method for managing content presentation, the method comprising:
   determining, by a first head mounted display (HMD) configured to permit a first field of view of at least a portion of a surrounding environment, that video content output of a presentation device is within the first field of view, wherein:
      the presentation device outputs the video content; and
      determining that the video content output of the presentation device is within the first field of view comprises:
         measuring a first color temperature of at least a portion of the first field of view; and
         determining that the video content output of the presentation device is within the first field of view based, at least in part, on a comparison of the first measured color temperature with a threshold color temperature;
   detecting, by the first HMD, a first reference event indicating that the video content output of the presentation device is no longer within the first field of view;
   in response to the first reference event, initiating, by the first HMD, continued presentation of the video content via the first HMD;
   determining that the video content output of the presentation device is still being viewed; and
   in response to determining the video content output of the presentation device is still being viewed, continuing presentation of the video content at the presentation device, wherein the video content presented by the presentation device corresponds to the video content presented by the first HMD.

24. The method for managing content presentation of claim 23, wherein detecting the first reference event comprises:
   measuring a second color temperature of the at least a portion of the first field of view; and
   determining that the first reference event has occurred based, at least in part, on a comparison of the second measured color temperature with a threshold color temperature.

25. The method for managing content presentation of claim 23, wherein determining that the video content output of the presentation device is still being viewed comprises:
   analyzing a captured image of a viewing region of the video content of the presentation device; and
   determining, based on the captured image, a user is present in the viewing region.

26. The method for managing content presentation of claim 23, wherein determining that the video content output by the presentation device is still being viewed is based on a location of a second HMD.

27. The method for managing content presentation of claim 23, further comprising:
   detecting, by a second HMD configured to permit a second field of view of at least a second portion of the surrounding environment, a second reference event indicating that the presentation device is no longer within the second field of view; and
   in response to detecting the first reference event and the second reference event, ceasing continued presentation of the video content by the presentation device.

28. A system for managing content presentation, the system comprising:
   memory; and
   one or more processors coupled to the memory and configured to:
   determine that, for a first head mounted display (HMD) configured to permit a first field of view of at least a portion of a surrounding environment, video content output of a presentation device is within the first field of view, wherein:
      the presentation device is outputting the video content; and
      determining that the video content output of the presentation device is within the first field of view comprises:
         measuring a first color temperature of at least a portion of the first field of view; and
         determining that the video content output of the presentation device is within the first field of view based, at least in part, on a comparison of the first measured color temperature with a threshold color temperature;

detect a first reference event indicating that the video content output of the presentation device is no longer within the first field of view;

in response to the first reference event, initiate continued presentation of the video content via the first HMD;

determine that the video content output by the presentation device is still being viewed; and in response to determining the video content output of the presentation device is still being viewed, continue presentation of the video content at the presentation device, wherein the video content presented by the presentation device corresponds to the video content presented by the first HMD.

29. The system of claim 28, wherein the one or more processors are further configured to:

measure, via the first HMD, a second color temperature of the at least a portion of the first field of view;

compare the second measured color temperature with a threshold color temperature; and based on the comparison, determine that the first reference event has occurred.

30. The system of claim 28, wherein the one or more processors are further configured to:

analyze a captured image of a viewing region of the video content of the presentation device; and determine, based on the captured image, a user is present in the viewing region.

31. The system of claim 28, wherein the one or more processors are further configured to determine that the video content output by the presentation device is still being viewed is based on a location of a second HMD.

32. The system of claim 28, wherein the one or more processors are configured to:

detect, by a second HMD configured to permit a second field of view of at least a second portion of the surrounding environment, a second reference event indicating that the presentation device is no longer within the second field of view; and in response to detecting the first reference event and the second reference event, cease continued presentation of the video content by the presentation device.

33. The system of claim 28, wherein the system comprises the first HMD and a second HMD.

34. A system for managing content presentation, the system comprising:

means for determining that, for a first head mounted display (HMD) configured to permit a first field of view of at least a portion of a surrounding environment, video content output of a presentation device is within the first field of view, wherein:

the presentation device outputs the video content; and the means for determining that the video content output of the presentation device is within the first field of view comprise:

means for measuring a first color temperature of at least a portion of the first field of view; and means for determining that the video content output of the presentation device is within the first field of view based, at least in part, on a comparison of the first measured color temperature with a threshold color temperature;

means for detecting, via the first HMD, a first reference event indicating that the video content output of the presentation device is no longer within the first field of view;

means for initiating continued presentation of the video content via the first HMD in response to the first reference event;

means for determining that the video content output of the presentation device is still being viewed; and means for continuing presentation of the video content at the presentation device in response to determining the video content output of the presentation device is still being viewed, wherein the video content presented by the presentation device corresponds to the video content presented by the first HMD.

35. The system of claim 34, wherein the means for detecting the first reference event comprises:

means for measuring a color second temperature of the at least a portion of the first field of view;

means for comparing the second measured color temperature with a threshold color temperature; and means for determining that the first reference event has occurred based on the comparison.

36. The system of claim 34, wherein the means for determining that the video content output of the presentation device is still being viewed comprises:

means for analyzing a captured image of a viewing region of the video content of the presentation device; and means for determining, based on the captured image, a user is present in the viewing region.

37. The system of claim 34, wherein the means for determining that the video content output by the presentation device is still being viewed uses a location of a second HMD.

38. The system of claim 34, further comprising:

means for detecting, by a second HMD configured to permit a second field of view of at least a second portion of the surrounding environment, a second reference event indicating that the presentation device is no longer within the second field of view; and means for ceasing continued presentation of the video content by the presentation device in response to detecting the first reference event and the second reference event.

* * * * *